(12) United States Patent
Miller et al.

(10) Patent No.: US 8,963,705 B2
(45) Date of Patent: Feb. 24, 2015

(54) WIRELESS CONTROL AND COORDINATION OF LIGHT BAR AND SIREN

(71) Applicant: Code 3, Inc., St. Louis, MO (US)

(72) Inventors: Roger L. Miller, Crestwood, KY (US); Joseph Bakalor, Maryland Heights, MO (US)

(73) Assignee: Code 3, Inc., St. Louis, MO (US)

( * ) Notice: Subject to any disclaimer, the term of this patent is extended or adjusted under 35 U.S.C. 154(b) by 0 days.

(21) Appl. No.: 13/691,121

(22) Filed: Nov. 30, 2012

(65) Prior Publication Data

US 2013/0154821 A1 Jun. 20, 2013

Related U.S. Application Data

(60) Provisional application No. 61/576,163, filed on Dec. 15, 2011.

(51) Int. Cl.
| | |
|---|---|
| *B60Q 1/52* | (2006.01) |
| *G08C 17/02* | (2006.01) |
| *B60Q 1/26* | (2006.01) |
| *B60Q 5/00* | (2006.01) |
| *B60Q 7/00* | (2006.01) |
| *H04B 7/26* | (2006.01) |
| *H04L 12/00* | (2006.01) |

(52) U.S. Cl.
CPC .............. *G08C 17/02* (2013.01); *B60Q 1/2611* (2013.01); *B60Q 5/00* (2013.01); *B60Q 7/00* (2013.01); *H04B 7/26* (2013.01); *H04L 12/00* (2013.01); *B60Q 2900/30* (2013.01)
USPC .......................... 340/471; 340/425.5; 340/474

(58) Field of Classification Search
USPC ............ 340/471, 425.5, 474, 815.45, 825.36; 362/493, 523
See application file for complete search history.

(56) References Cited

U.S. PATENT DOCUMENTS

| | | | | |
|---|---|---|---|---|
| 5,931,573 | A | * | 8/1999 | Knox .............................. 362/493 |
| 7,476,013 | B2 | * | 1/2009 | Gergets et al. ................. 362/493 |
| 2002/0112026 | A1 | | 8/2002 | Fridman et al. |
| 2005/0111231 | A1 | | 5/2005 | Crodian et al. |
| 2007/0083298 | A1 | | 4/2007 | Pierce et al. |
| 2007/0195939 | A1 | | 8/2007 | Sink et al. |
| 2010/0194556 | A1 | * | 8/2010 | LaRosa ......................... 340/471 |
| 2012/0119900 | A1 | * | 5/2012 | Walther et al. ................. 340/474 |
| 2012/0201041 | A1 | | 8/2012 | Gergets et al. |

FOREIGN PATENT DOCUMENTS

| | | |
|---|---|---|
| GB | 2481077 A | 12/2011 |
| WO | 2011/008876 A1 | 1/2011 |

* cited by examiner

*Primary Examiner* — Toan N Pham

(57) ABSTRACT

A wireless interface module is used with at least one of a light bar, a control head, and/or a siren so that a mobile device can wirelessly control the light bar and/or siren via a user interface.

20 Claims, 16 Drawing Sheets

WIRELESS CONTROL AND COORDINATION OF LIGHT BAR AND SIREN

BACKGROUND INFORMATION

The present disclosure generally relates to light bars and/or sirens and wireless remote control, coordination, synchronization and/or interaction with other vehicle systems.

Light bars and sirens as used on various emergency vehicles have multiple functions. Such light bars and sirens are controlled from control panels or other control devices within the passenger compartments of the emergency vehicles. The control devices are usually physically connected to the light bar or siren by wiring. Frequently, the operators of these vehicles are not in their vehicles but outside their vehicles when a change to a function of a light bar or siren is desired. This necessarily requires the operators to enter the passenger compartment of their vehicles in order to effect a functional change in a light bar or siren. In certain scenarios, there is a desire for operators to be able to control at least some aspects of their light bars and/or sirens remotely.

In addition, there are situations in which one or more light bars and/or one or more sirens are being used simultaneously at a location. Current systems do not provide a mechanism to coordinate the use of the light bars and/or sirens to reduce their interference with each other. In certain scenarios, there is a desire to coordinate at least some aspects of their use and/or their function with each other and/or with other vehicle systems so that they do not counteract each other or interfere with each other.

SUMMARY

Systems and methods are described herein for controlling a siren, warning light systems, auxiliary lighting and/or accessories such as winches or spot lights in a motorized vehicle.

In one example, a wireless communications circuit in the exemplary form of a Wi-Fi interface module is used in combination with a light bar, siren and/or a control head, so that a mobile device can remotely control the light bar and/or siren via the Wi-Fi interface module.

In one example, one or more light bars and/or one or more sirens are coordinated to enhance their ability to notify others of a situation.

In one example, one of more of the following are linked to each other and are linked to the Internet via a hot spot for remote control, remote coordination and/or remote synchronization: a light bar, a siren, an additional vehicle system interface (to radar, video, ALPR, etc.), a control head, a mobile device and a computer.

BRIEF DESCRIPTION OF THE DRAWINGS

FIG. 4 is a variation of FIG. 1 wherein the Wi-Fi transceiver is located within a housing of the light bar.

FIG. 5 is a variation of FIG. 2 wherein the Wi-Fi transceiver is located within the control head.

FIG. 6 is a variation of FIG. 2 wherein the Wi-Fi transceiver is located within the siren.

Corresponding reference characters indicate corresponding parts throughout the drawings.

DETAILED DESCRIPTION

In FIGS. 1-16, the arrows and connecting lines represent various types of wired and/or wireless links which facilitate control, data transfer and/or coordination. As used herein, "connect" means a wired and/or wireless connection. Unless otherwise indicated, all connections may transmit digital signals, analog signals, control signals and/or data signals. In FIGS. 1-6, the arrows generally indicate embodiments in which a wireless control signal identified as a control link is communicated between devices. In FIGS. 7-11, it is contemplated that some or all the arrows may be hard-wired links and some or all of the arrows may be wireless links. The link to an additional vehicle system interface(s) may also transmit data collected by a vehicle system (e.g., RADAR, video, ALPR, etc.) connected to the interface. In FIGS. 12-15, an alternative or additional link is illustrated to represent a coordination signal illustrating examples in which coordination signal is communicated between devices. FIG. 16 illustrates a wireless linking via a cellular network.

As used herein, some of the examples refer to an 802.11 chip and/or a Wi-Fi interface module. However, it should be understood that any wireless communications circuit using any wireless communication protocol may be used, including but not limited to protocols such as 802.11, Bluetooth, Zigbee, DASH7, Z-Wave. Thus, any references herein to Wi-Fi, 802.11 or any other devices or protocols are exemplary and any wireless communication circuit using any protocol may be used in place thereof.

Figure 1:
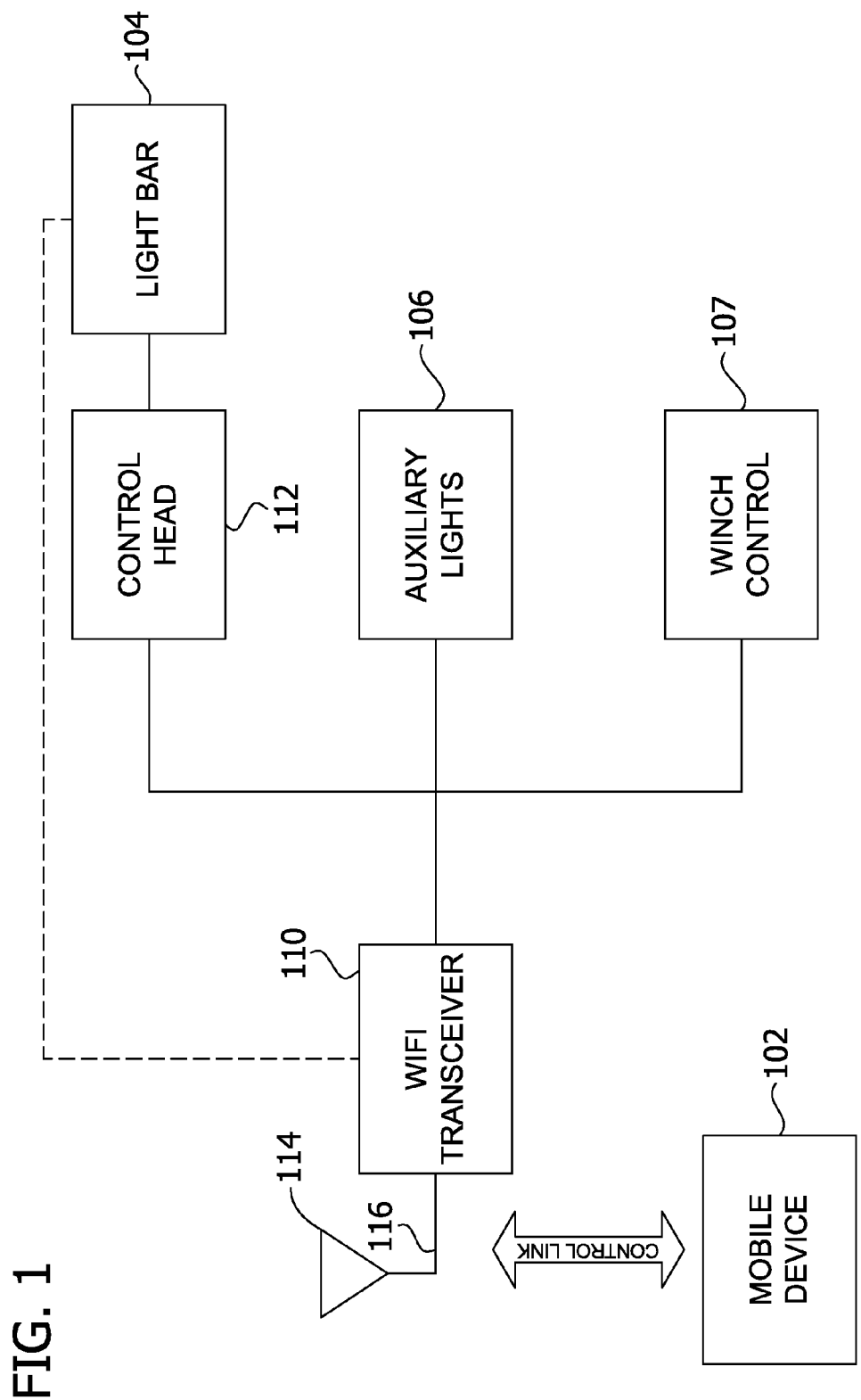
FIG. 1 illustrates an example system in which a mobile device controls a light bar, auxiliary lights (e.g., vehicle lights, spot lights) and/or a winch via a wireless communications circuit in the exemplary form of a Wi-Fi (wireless fidelity) transceiver which is connected to the light bar, auxiliary lights and winch for remote control by the mobile device.

FIG. 1 illustrates an example system in which a mobile device 102 controls a light bar 104, auxiliary lights 106 and/or a winch 107 via a wireless communications circuit in the exemplary form of a Wi-Fi transceiver 110. The transceiver 110 is connected to the light bar 104 either via a control head 112 or directly without any connection to the control head 112, as illustrated by the dashed line, in order to transmit control signals from the mobile device 102 to the light bar 104. Control signals may include any signal which affects function, such as ON/OFF commands, pattern selection commands, timing signals, and/or custom control signals. The transceiver 110 is also connected to the auxiliary lights 106 and the winch 107 for remotely controlling the auxiliary lights 106 and winch 107 via the mobile device via control signals. It is contemplated that the mobile device may be any device which employs the wireless protocol, such as a cell phone, a smart phone, a tablet style computer, a laptop, a netbook, a utilitarian device (e.g., a flashlight) with an integrated controller, a dedicated key fob controller or any other protocol compatible device.

The Wi-Fi transceiver 110 in one form transmits a signal (e.g., 2.4 GHz, 5.1 GHz, or any permissible frequency) via an antenna 114 connected to the transceiver 110 via a cable 116 (e.g., a 3" low-loss coaxial cable). The mobile device 103 communicates with the transceiver 110 via the transmitted signal. The transceiver 110 is mounted on a vehicle which also has mounted to it the light bar 104, auxiliary lights 106 and winch 107. The auxiliary lights 106 may include such lights as flashing headlights, supplemental strobes and other vehicle or auxiliary lighting which are a part of or added to the vehicle. In one example, the transceiver 110 may be mounted on the rear deck of an emergency passenger vehicle such as a police car. In another example, the transceiver 110 may be mounted within the light bar 104 or control head 112. Outputs of the transceiver 110 are digital signals and may be connected to a controller of the light bar 104, auxiliary lights 106 or winch 107 or may be directly connected to a processor of the light bar 104, auxiliary lights 106 or winch 107. If the light bar 104, auxiliary lights 106 and/or winch 107 require analog control signals in order to control their operation, a digital-to-analog converter may be used to convert the output digital signals of the transceiver 110 to corresponding analog signals. Conditioning circuits may also be used to condition the analog or digital signals.

In one form, FIG. 1 illustrates a system for use on a vehicle (not shown) with a power supply (not shown). The light bar 104 is powered by the power supply and has a plurality of light heads (not shown) for providing emergency warning signals. The transceiver 110 comprises a Wi-Fi interface module for communicating with the mobile device 102 via a user interface (see FIG. 3) provided to the mobile device 102 by the Wi-Fi interface module. The user interface 302 is displayed on a display panel of the mobile device 102 so that a user may interact with it. The module is powered by the power supply of the vehicle. An operator uses the user interface to provide operating instructions to the light bar 104, auxiliary lights 106 and/or winch 107 via the Wi-Fi interface module.

In this system, the mobile device 102 may include one or more of the following: a cell phone for providing or displaying the user interface 302, a flashlight having a processor and a display screen for displaying a providing or displaying the user interface 302, a key fob, a boy worn device such as a pendant or any other accessory carried by a user. Alternatively or in addition, the mobile device may include a portable computer, such as a netbook or iPad®. Alternatively or in addition, the user interface 302 may comprise a mobile APP (application) executable by a cell phone or portable computer for communicating with the Wi-Fi interface module.

Figure 2:
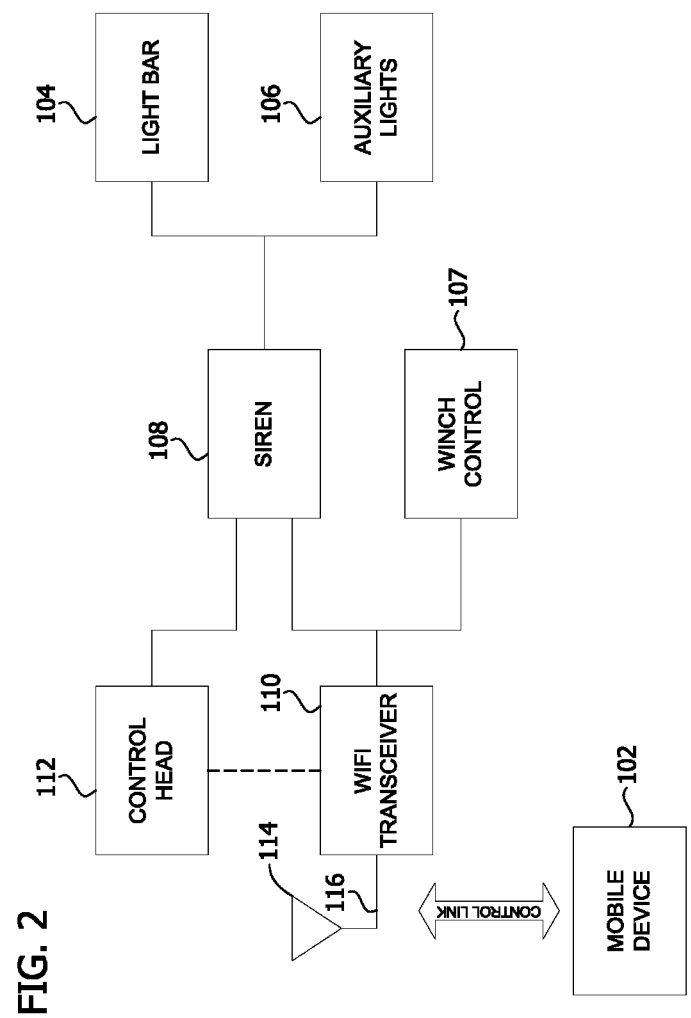
FIG. 2 illustrates an example system in which a mobile device controls a light bar, auxiliary lights and/or a siren via a wireless communications circuit in the exemplary form of a Wi-Fi transceiver which is connected to the siren so that the light bar, auxiliary lights and/or siren may be remotely controlled by the mobile device and/or controlled by a control head.

FIG. 2 illustrates an example system in which the mobile device 102 controls the light bar 104, the auxiliary lights 106, a winch 107 and/or a siren 108 via a wireless communications circuit in the exemplary form of a Wi-Fi transceiver 110 which is connected to the winch 107 and siren 108. Thus, the light bar 104, auxiliary lights 106, winch 107 and/or siren 108 may be remotely controlled by the mobile device 102 and/or controlled by a control head 112. For example, the siren 108 may be a Z3™ Siren manufactured and sold by Code 3, such as described in U.S. patent application Ser. No. 13/478,753, filed May 23, 2012, the entire disclosure of which is incorporated herein by reference in its entirety.

The transceiver 110 is connected to a siren processor (see FIG. 6) which controls the operation of the siren 108 and which is connected to the light bar 104 for also controlling the operation of the light bar. Optionally, the siren processor may also be connected to auxiliary lights 106 for controlling the operation of the auxiliary lights 106.

The system permits an operator to control the siren 108, light bar 104 and auxiliary lights 106 in various ways. For example, the control head 112 connected to the siren 108 has various switches, buttons or other devices which provide signals in response to operator input to the siren 108, light bar 104 and auxiliary lights 106. Alternatively, and in addition, the mobile device 102 is connected to the Wi-Fi transceiver via a Wi-Fi signal transmitted and received by both the Wi-Fi transceiver and the mobile device. The mobile device displays a user interface 302 (e.g., in the form of a webpage; see FIG. 3) based on instructions provided by the Wi-Fi transceiver for presentation to the operator for receiving operator input. In one example, the instructions for the user interface 302 are accessible via a web browser of the mobile device 102, and may be accessible by accessing a particular IP address. The operator uses the user interface 302 to provide input to the Wi-Fi transceiver which provides corresponding signals to the siren 108 to control the siren 108, light bar 104 and/or auxiliary lights 106 as directed by the operator.

In one form, the control head 112 includes a display such as selectively illuminated buttons indicating a status of the light bar. For example, the illuminated buttons may indicate which function of the light bar is operating. Similarly, the user interface may include a display indicating the status of the light bar, such as flashing or backlit icons. The status indications provided by the control head display and the user interface display are consistent with each other. For example, if an operator uses the control head 112 to turn ON a take-down light by pushing a button on the control head 112, the button is illuminated to indicate that the take-down light has been energized. Simultaneously, the user interface 302 would be updated to also indicate that the take-down light has been energized by illuminating a take-down icon (see FIG. 3; reference character 316) of the interface 302. As another example, if an operator uses the user interface 302 to turn ON a take-down light by touching icon 316 on the user interface 302, the icon 316 is illuminated to indicate that the take-down light has been energized. Simultaneously, the control head 112 is updated to also indicate that the take-down light has been energized by illuminating a take-down button of the control head 112.

Figure 3:
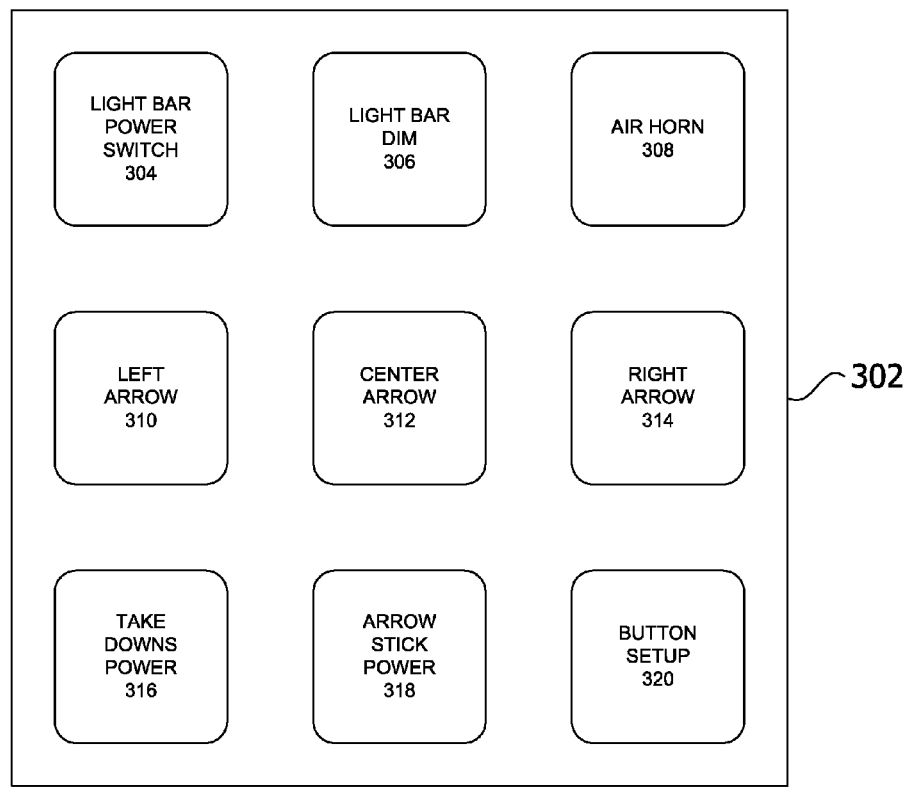
FIG. 3 illustrates an example of a webpage (e.g., graphical user interface) which may be generated by mobile APP (application), presented by a wireless communications circuit in the exemplary form of a Wi-Fi transceiver to a mobile device to permit an operator to control a light bar connected to the Wi-Fi transceiver.

FIG. 3 illustrates one example of a user interface presented in the form of a webpage or GUI 302 displayed on a mobile device. The user interface (which may be generated by a mobile APP (application) permits an operator to control a light bar, auxiliary lights and/or a siren connected to the Wi-Fi transceiver. The GUI 302 includes a plurality of icons 304-320 presented to the operator on a touch screen of the mobile device 102. The operator optionally selects a particular function by touching one of the icons on the touch screen which corresponds to the function. For example, if an operator wants to turn ON a light bar which is OFF, the operator would touch a top left icon 304. Similarly, if an operator wants to turn OFF a light bar which is ON, the operator would touch the top left icon 304. If an operator wants to dim a light bar which is ON, the operator would touch a top center icon 306. Similarly, an operator could turn ON or OFF:

an air horn feature by touching the top right icon 308;
a left, center or right directional pattern provided by the light bar, an ArrowStick® light, other traffic directing lights, or auxiliary lighting by touching one of the middle row icons 310, 312, 314;
take down lights of the light bar by touching a bottom left icon 316; and
an ArrowStick® light or other traffic directing light provided by the light bar or auxiliary lighting by touching a bottom center icon 318.

Optionally, a setup icon 320 (bottom right) allows an operator to rename an icon and/or to change the function of an icon. In one example, each button of the user interface 302 is dynamic so that its name and function is programmable by the user. For example, the setup icon 320 may be used to program or change an icon. Alternatively or in addition, touching an icon continuously for a preset period (e.g., three seconds) may allow a user to change its name and/or function. Similarly, the buttons on a control head 112 may be programmable. Alternatively or in addition, a function of a button on the control head may be changed by changing the wire connected to a connector position of the control head which corresponds to the button. It is also contemplated that buttons and/or icons may not be named and/or may not have pre-assigned functions so that a user assigns names and functions before using the system.

Figure 4:
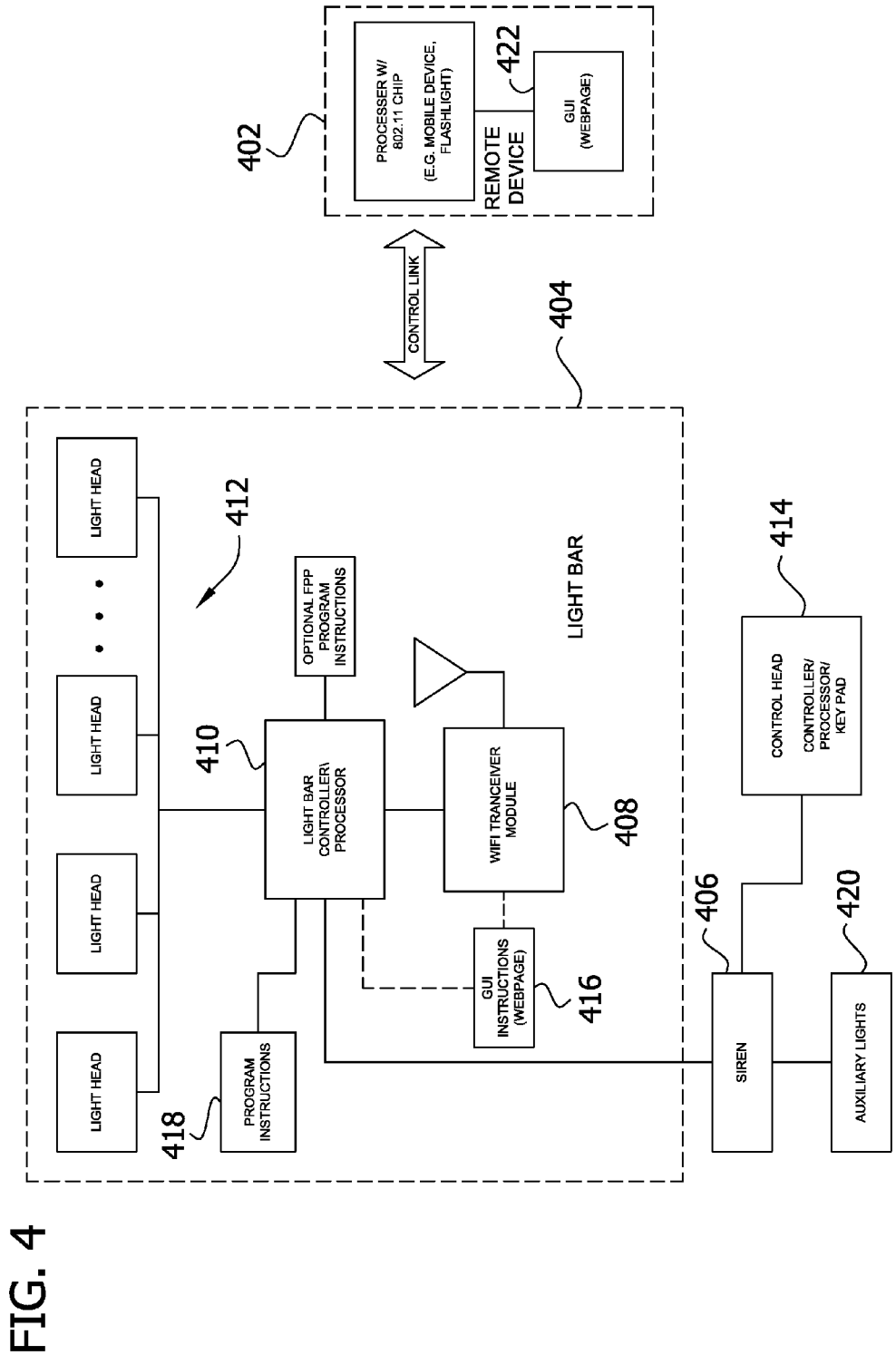
FIG. 4 illustrates an example system in which a remote device controls a light bar and/or siren via a wireless communications circuit in the exemplary form of a Wi-Fi transceiver which is part of the light bar and which is connected to the light bar processor so that the light bar and/or siren may be remotely controlled by the remote device.
Figure 5:
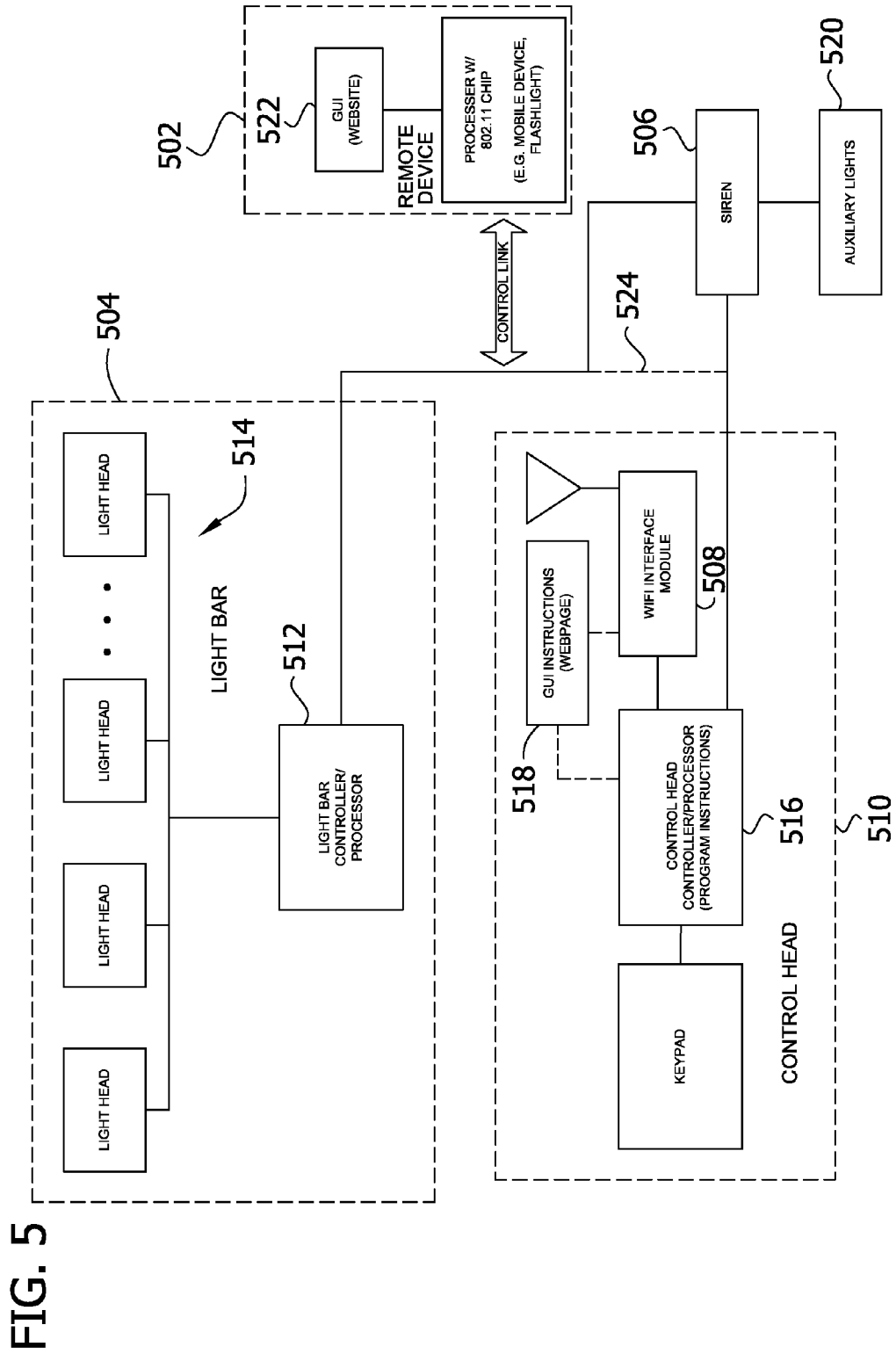
FIG. 5 illustrates an example system in which a remote device controls a light bar and/or siren via a wireless communications circuit in the exemplary form of a Wi-Fi interface module which is part of a control head connected to the light bar processor and connected to a siren so that the light bar and/or siren may be remotely controlled by the remote device.
Figure 6:
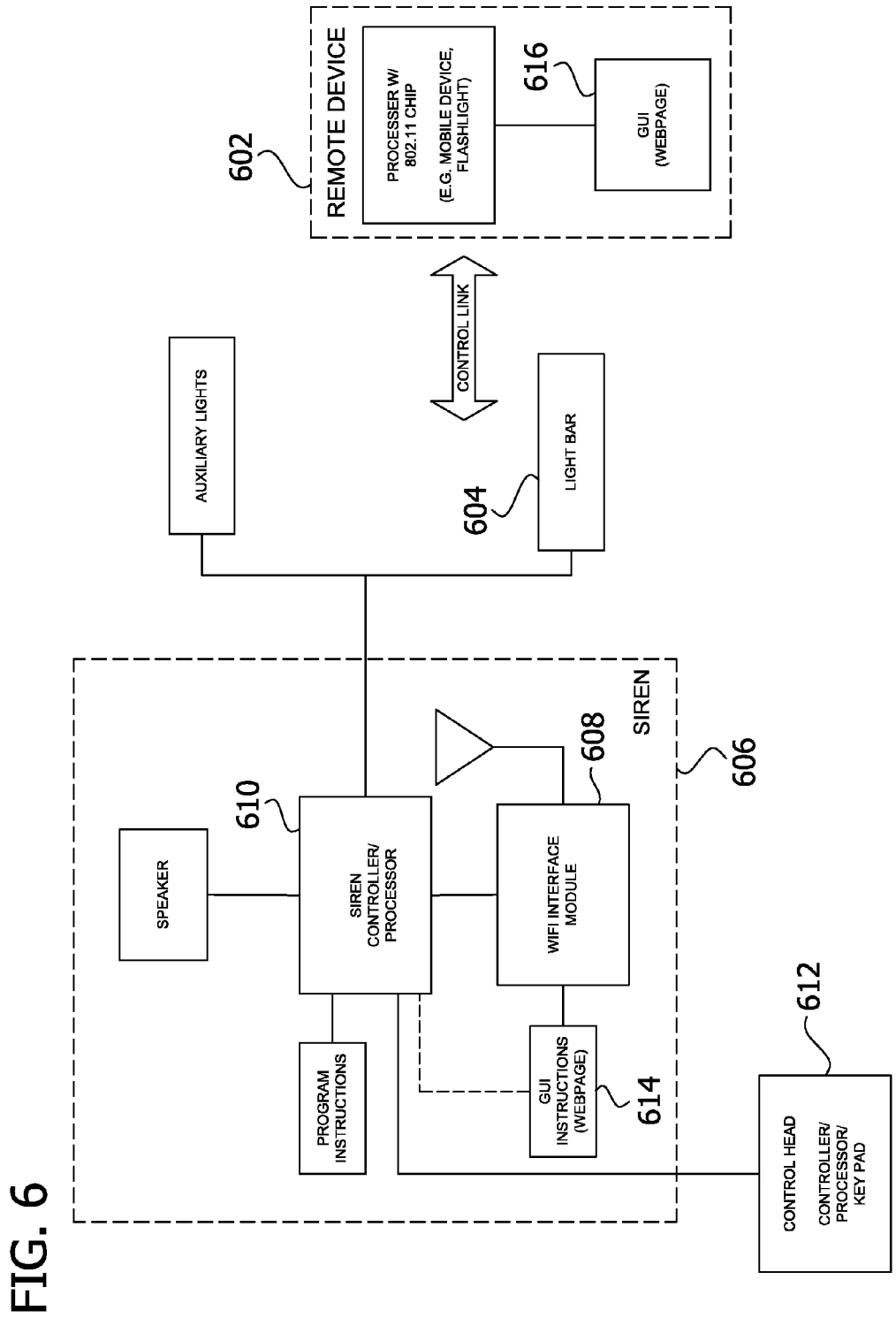
FIG. 6 illustrates an example system in which a remote device controls a light bar and/or siren via a wireless communications circuit in the exemplary form of a Wi-Fi interface module is part of the siren and is connected to the siren processor so that the light bar and/or siren may be remotely controlled by the remote device.

Instead of or in addition to a graphical user interface, the user interface (which may be generated by a mobile APP (application) may comprise one or more of the following: a text controlled interface responsive to text messages, a voice controlled interface responsive to commands (e.g., voice, touch, tapping, shaking, movement) or any other interface which allows a user to provide information to be transmitted via the transceiver 110. In FIGS. 4-6, the interface is illustrated as a graphical user interface (GUI) created by GUI instructions. It is contemplated that GUI instructions may be replaced by or may be used in addition to one or more of the following: text interface instructions for receiving text commands from the user, voice interface instructions for receiving voice commands from the user, or any other interface instructions which receive commands from the user.

As noted above, in one example, the status of the system is displayed by the control head 112 and the status of the system is displayed by the GUI 302 presented on the mobile device 102. The status of the system displayed by the control head 112 can be configured to be the same as the status of the system displayed by the user interface presented by the mobile device and vice versa. It is also contemplated that in some examples the control head could have a display in which case both the control head display and the mobile device display would simultaneously provide the same indications.

In one example, access to the user interface may require a log-in to control the users who have rights to control a system. In a specific example, several users may have rights to control a system but the system can be configured so that only one user at a time is logged in and has control.

FIG. 4 illustrates an example system in which a remote device 402 controls a light bar 404 and/or siren 406 via a wireless communications circuit in the exemplary form of a Wi-Fi transceiver module 408 which is part of the light bar 404 and which is connected to the light bar processor 410 so that the light bar and/or siren may be remotely controlled by the remote device 402. FIG. 4 is a variation of FIG. 1 wherein the Wi-Fi transceiver module 408 is located within the light bar 404. The system illustrated comprises light bar 404, the light bar processor 410 (e.g., a controller) and a plurality of light heads 412 (e.g., LED modules) controlled by the light bar processor 410 to generate warning signals of various patterns selected by an operator. A control head 414 has a control head processor (e.g., a controller) connected to the light bar processor 410 via the siren 406 and a keypad for use by the operator to provide operating instructions to the light bar processor 410 to turn ON or OFF or to operate and generate a particular light pattern. The Wi-Fi module 408 (e.g., an MRF24WB0MA or MRF24WB0MB, manufactured by Microchip, or similar chip) is connected to the light bar processor 410 and communicates with the remote device 402 (e.g., a mobile phone or a flashlight) via a graphical user interface (GUI) 422 provided to the remote device by the Wi-Fi interface module.

The siren 406 is connected to the control head so that the control head is used by the operator to provide operating instructions to the siren. In addition, the GUI 302 may be used by the operator to provide operating instructions to the siren 406 via the Wi-Fi transceiver module 408, via the light bar processor and via the control head processor. Thus, when the operator has access to the control head 414, the operator may use the control head 414 to control the light bar 404 and/or siren 406. When the operator does not have access to the control head, the operator may use remote device 402 to access the GUI 422 to remotely control the light bar and/or siren 406.

The GUI 422 is for use by the operator to provide operating instructions to the light bar processor 410 via the Wi-Fi transceiver module 408 to energize, de-energize or change the light bar pattern or function. The GUI 422 is generated by instructions stored in a memory device 416 of the Wi-Fi module 408 or a memory device 418 the light bar processor 410 which includes program instructions.

For example, the operator may have remote device 402 with a touch screen. The GUI 422 would present various buttons on the device 402 which would allow the operator to remotely control the light bar 404 and/or siren 406. The operator would have the ability to do one or more of the following to the light bar 404 and/or siren 406: energize or de-energize, change patterns of the light bar, change audio signals of the siren, and activate any other functions of the light bar and siren (e.g., use a speaker on the light bar to transmit an audio message). Also, auxiliary lights 420 may be connected to the siren 406 so that the operator may control the auxiliary lights 420 via the remote device 402 and/or the control head 414.

FIG. 5 illustrates an example system in which a remote device 502 controls a light bar 504 and/or siren 506 via a wireless communications circuit in the exemplary form of a Wi-Fi interface module 508 which is part of a control head 510 connected to the light bar processor 512 and connected to the siren 506 so that the light bar 504 and/or siren 506 may be remotely controlled by the remote device 502. FIG. 5 is a variation of FIG. 2 wherein the Wi-Fi transceiver is located within the control head 510. As illustrated, the system includes the light bar 504 or the siren 506 or both, a control head 510 and a Wi-Fi interface module 508. If the system includes the light bar 504, the light bar has a light bar processor 512 and a plurality of light heads 514 controlled by the light bar processor 512. The control head 510 has a control head processor 516 connected to the light bar processor 512. The control head 510 is used by an operator to provide operating instructions to the light bar processor 512. The Wi-Fi interface module 508 is connected to the control head processor 516 and communicates with the remote device 502 via a GUI 522 provided to the remote device 502 by the Wi-Fi interface module. GUI instructions for generating a webpage are stored in a memory device 518 and executed by the module 508 or the control head processor 516. As a result, the GUI 522 is used by the operator, such as when the operator is remote from the control head 510, to provide operating instructions to the light bar processor 512 via the Wi-Fi interface module and via the control head processor.

If the system includes the siren 506, the siren may be connected to the control head 510 so that the control head 510 is for use by the operator to provide operating instructions to the siren 506. The GUI 522 is also for use by the operator to provide operating instructions to the siren 506 via the Wi-Fi interface module 508 and via the control head processor 516.

In another form as shown in FIG. 5, the system includes the siren 506, a control head 510 and a Wi-Fi interface module 508. The control head 510 has a control head processor 516 connected to the siren 506 for use by an operator to provide operating instructions to the siren 506. The Wi-Fi interface module 508 is connected to the control head processor 516 for communicating with the remote device 502 via the GUI 522 provided to the device by the Wi-Fi interface module 508. The GUI 522 is for use by the operator to provide operating instructions to the siren 506 via the Wi-Fi interface module 508 and the control head processor 510. As with FIG. 4, auxiliary lights 520 may be connected to the siren 506.

Alternatively, the system may include the light bar 504 having a light bar processor 512 and a plurality of light heads 514 controlled by the light bar processor 512. The light bar processor 512 connects to the control head 510 via line 524 which is for use by the operator to provide operating instructions to the light bar processor 512. The GUI is for use by the operator to provide operating instructions to the light bar processor 512 via the Wi-Fi interface module 508 and via the control head processor 516.

FIG. 6 illustrates an example system in which a remote device 602 controls a light bar 604 and/or siren 606 via a wireless communications circuit in the exemplary form of a Wi-Fi interface module 608 which is included in the siren 606. The Wi-Fi interface module 608 is connected to a siren processor 610, which allows the light bar 604 and/or siren 606 to be remotely controlled by the remote device 602. The system includes the siren 606 having the siren processor for controlling the siren 606 and a control head 612 having a control head processor connected to the siren processor 610. The control head 612 is for use by an operator to provide operating instructions to the siren processor 610. The system also includes a Wi-Fi interface module 608 connected to the siren processor 610 for communicating with the remote device 602 via a GUI 616 provided to the device by the Wi-Fi interface module 608. The GUI 616 is for use by the operator to provide operating instructions to the siren processor 610 via the Wi-Fi interface module 608. Instructions for generating the GUI are stored in a memory device 614 and executed by the processor 610 or module 608.

Optionally, the light bar 604 has a light bar processor and a plurality of light heads which are controlled by the light bar processor. The light bar processor is connected to the control head 612. In this example, the control head 612 is used by the operator to provide operating instructions to the light bar processor and a GUI 616 of the device 602 is for use by the operator to provide operating instructions to the light bar 604 via the Wi-Fi interface module 608, via the siren processor 610 and via the control head processor.

In one example, the link between one or more light bars or sirens and a remote device may be used to program the light bars or sirens. For example, a police precinct may have a fleet of several vehicles with light bars/sirens require at least some of the same operating parameters and/or patterns. Each vehicle in the fleet, either separately or simultaneously with other vehicles, can be programmed via the remote device.

In the system of FIGS. 4-6, a tangible, non-transitory, computer readable storage media or device, e.g., a memory, is provided for use by the Wi-Fi interface module for retrieval and execution of GUI instructions stored thereon for displaying the GUI. Optionally, a processor to which the Wi-Fi interface module is connected may provide or execute the GUI instructions.

In FIGS. 1, 2, 4-16, a tangible, non-transitory, computer readable storage media or device, e.g., a memory, is provided for use by the light bar processor for retrieval and execution of program instructions stored thereon for controlling the selective energization of the lights heads to provide various light patterns or emergency warning signals.

In FIGS. 2, 4-16, a tangible, non-transitory, computer readable storage media or device, e.g., a memory, is provided for use by the siren processor for retrieval and execution of program instructions stored thereon for controlling the selective energization of the siren to provide various audible modes.

In FIG. 4, optional FPP (flash pattern program) instructions for execution by the light bar controller are stored in a tangible, non-transitory, computer readable storage media or device, e.g., a memory. The FPP instructions are a tool allowing selective users to change the light patterns stored in light bar program instructions stored in a light bar memory device. In one example, the mobile device communicates with the FPP tool via the light bar processor and via a wireless communications circuit to change light patterns. Usually, the tool is password protected.

Depicted in FIGS. 7-11, are example wireless systems having a wireless communications circuit in the form of an exemplary Wi-Fi interface module included with one of a light bar LB, a control head CH, and a siren SR. In general, the wireless system comprises a light bar LB device, a siren SR device, a control head CH device responsive to operator input for controlling the light bar LB device and the siren SR device, a mobile device MD, a plurality of wireless communication circuits, such as 802.11 chips (e.g., 802.11a/b/g/n), and a wireless (e.g., Wi-Fi) interface module connected to one of the light bar LB device, the siren SR device, and the control head CH device. Each of the other devices not connected the Wi-Fi interface module includes one of the 802.11 chips, which allows the devices to communicate with each other via the Wi-Fi interface module. For convenience, the examples refer to an 802.11 chip and a Wi-Fi interface module. However, it should be understood that any wireless circuit and any communications protocol may be used, including but not limited to Bluetooth, Zigbee, DASH7, Z-Wave.

In one example, systems and methods as noted herein provide a communication path for control information and/or data of additional vehicle systems. For example, the control signals for vehicle systems such as a Radar Speed Measuring (RSM) system, a Video Recording system and an Automated License Plate Recognition (ALPR) system may be communicated from a mobile device via the linked devices to the vehicle system to control the vehicle system. This permits an operator to remotely control the vehicle systems. If police officers are away from their vehicles, they can turn ON or OFF or change the function of a vehicle system by communicating with the vehicle system via their mobile device. As another example, data generated by vehicle systems may be communicated from the vehicle system via the linked devices to the mobile device. If police officers are away from their vehicles, they can view RSM system outputs, video generated by the vehicle video recording system and/or ALPR generated information on their mobile devices.

Figure 7:
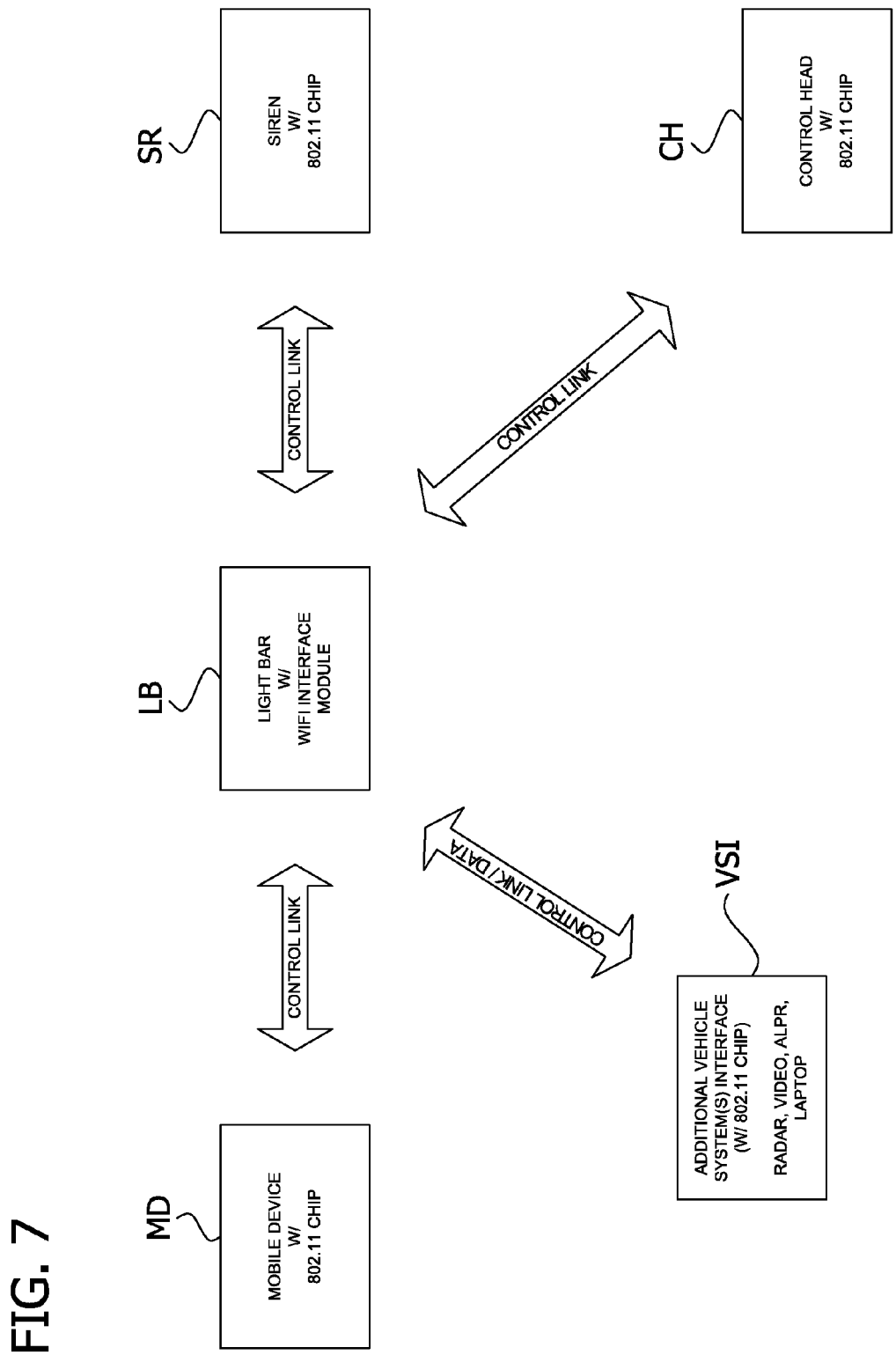
FIG. 7 illustrates an example wireless system in which a wireless communications circuit in the exemplary form of a Wi-Fi interface module is part of light bar and the light bar, a mobile device, a siren, an additional vehicle system(s) interface, and/or a control head communicate with each other via the Wi-Fi interface module so that the light bar, siren and/or additional vehicle system(s) may be remotely controlled by mobile device and/or the control head.

FIG. 7 illustrates an example wireless system in which a wireless communications circuit in the exemplary form of a Wi-Fi interface module is included in the light bar LB. The light bar LB, a mobile device MD, a siren SR, an additional vehicle system(s) interface VSI, and/or a control head CH can communicate with each other via the Wi-Fi interface module, which allows the light bar LB, siren SR and/or additional vehicle system(s) to be remotely controlled by mobile device MD and/or the control head CH. An optional additional vehicle system interface VSI may be linked to the system either wirelessly or by a hard-wire connection. For example, the vehicle system interface VSI may include an 802.11 chip for communicating from a vehicle system to the light bar LB Wi-Fi interface module or it may be hardwired to the light bar LB, the siren SR or the control head CH. The interface VSI may also include analog-to-digital converters from converting analog signals from a vehicle system into digital signals to be provided to the Wi-Fi module. The interface VSI may also include digital-to-analog converters from converting digital signals from a Wi-Fi interface module into analog signals to be applied to the vehicle system.

Figure 8:
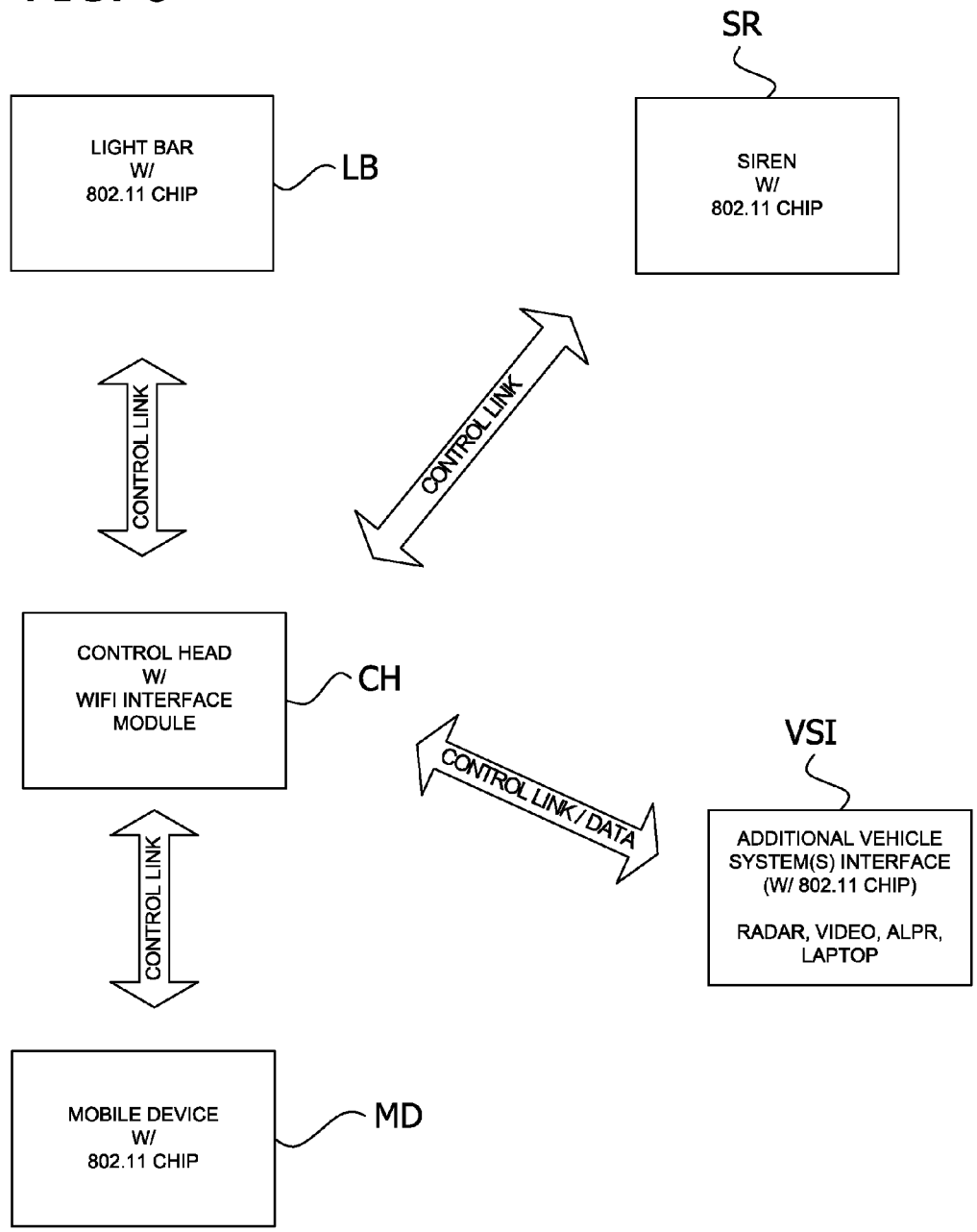
FIG. 8 illustrates an example wireless system in which a wireless communications circuit in the exemplary form of a Wi-Fi interface module is part of control head and the control head, a light bar, a mobile device, an additional vehicle system(s) interface, and a siren communicate with each other via the Wi-Fi interface module so that the light bar, siren and/or additional vehicle system(s) may be remotely controlled by mobile device and/or the control head.

FIG. 8 illustrates an example wireless system in which a wireless communications circuit in the exemplary form of a Wi-Fi interface module is included in the control head CH. The control head CH, a light bar LB, a mobile device MD, an additional vehicle system(s) interface VSI, and a siren SR can communicate with each other via the Wi-Fi interface module, which allows the light bar LB, siren SR and/or additional vehicle system(s) to be remotely controlled by mobile device MD and/or the control head CH. An optional additional vehicle system interface VSI may be linked to the system either wirelessly or by a hard-wire connection. For example, the interface may include an 802.11 chip for communicating with the control head CH Wi-Fi interface module or it may be hardwired to the light bar LB, the siren SR or the control head CH.

Figure 9:
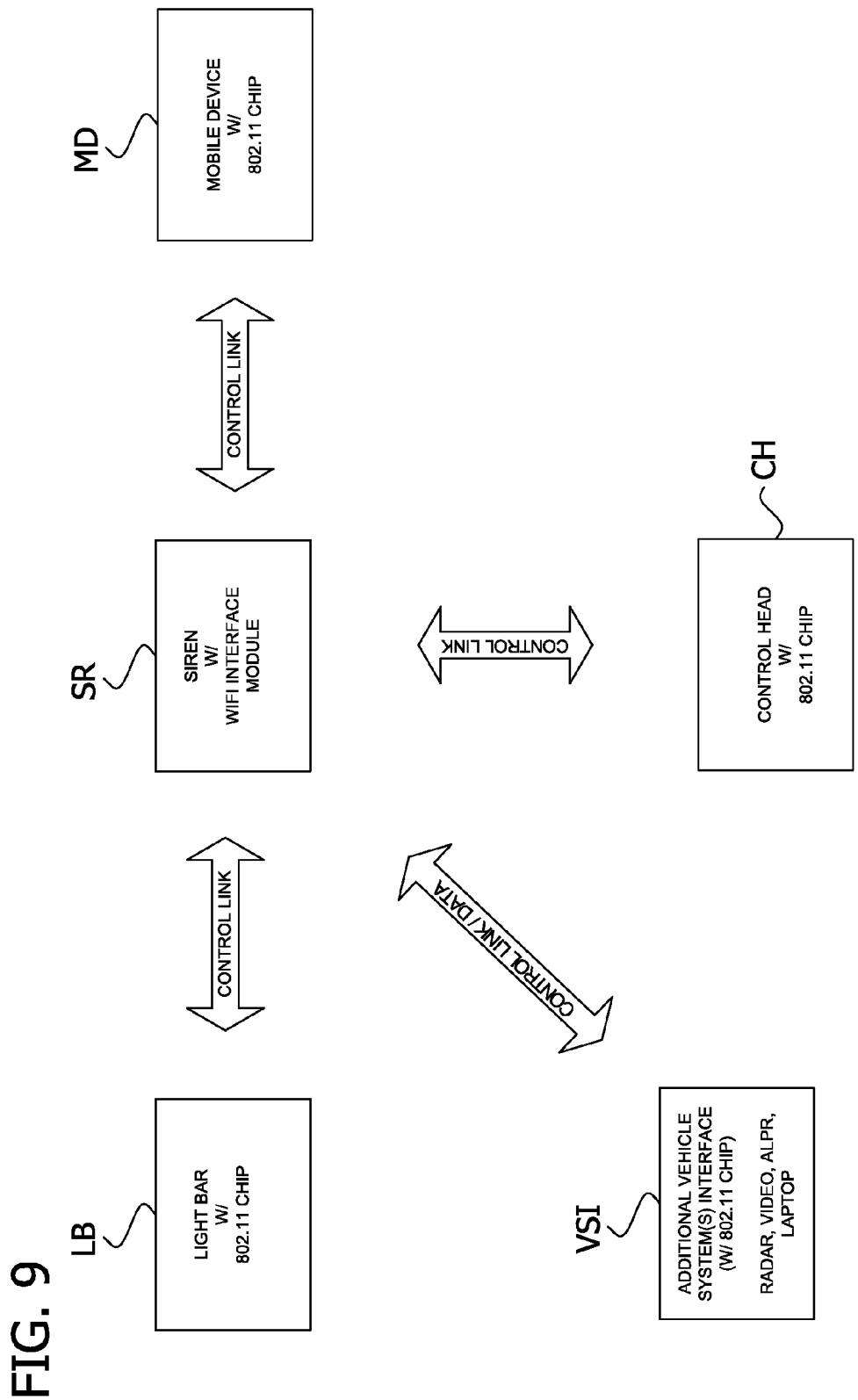
FIG. 9 illustrates an example wireless system in which a wireless communications circuit in the exemplary form of a Wi-Fi interface module is part of siren and the siren, a control head, a mobile device, an additional vehicle system(s) interface, and a light bar communicate with each other via the Wi-Fi interface module so that the light bar, siren and/or additional vehicle system(s) may be remotely controlled by mobile device and/or the control head.

FIG. 9 illustrates an example wireless system in which a wireless communications circuit in the exemplary form of a Wi-Fi interface module is included in the siren SR. The siren SR, control head CH, mobile device MD, an additional vehicle system(s) interface VSI, and a light bar LB can communicate with each other via the Wi-Fi interface module, which allows the light bar LB, siren SR and/or additional vehicle system(s) to be remotely controlled by mobile device MD and/or the control head CH. An optional additional vehicle system interface VSI may be linked to the system either wirelessly or by a hard-wire connection. For example, the interface may include an 802.11 chip for communicating with the siren SR Wi-Fi interface module or it may be hardwired to the light bar LB, the siren SR or the control head CH.

Figure 10:
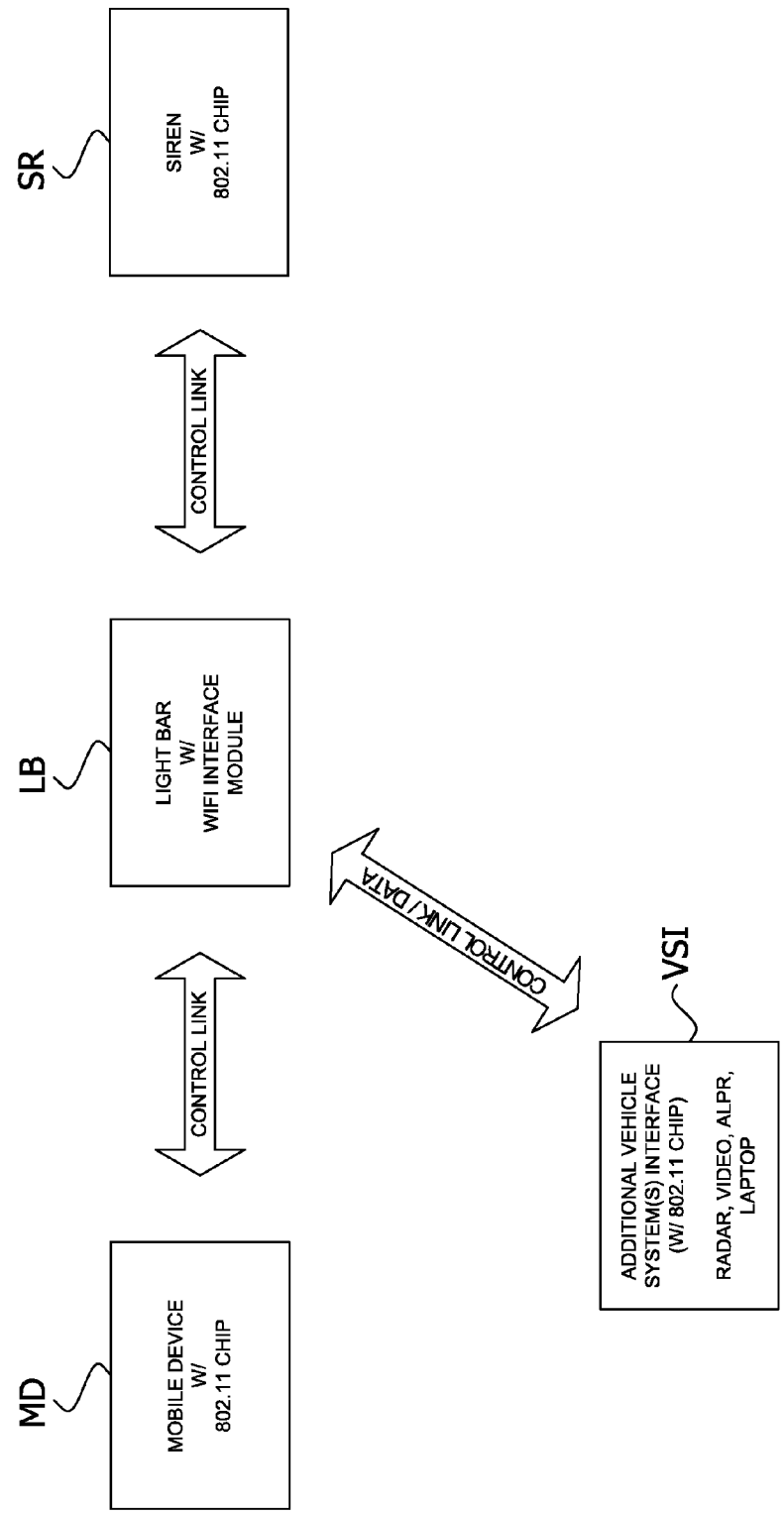
FIG. 10 illustrates an example wireless system in which a wireless communications circuit in the exemplary form of a Wi-Fi interface module is part of light bar and the light bar, a mobile device, and a siren communicate with each other via the Wi-Fi interface module wherein the mobile device functions as a control head and no control heads are needed so that the light bar, siren and/or additional vehicle system(s) may be remotely controlled by mobile device.

In yet another example, FIG. 10 illustrates a wireless system with a wireless communications circuit in the exemplary form of a Wi-Fi interface module connected to a light bar LB in which no control heads are needed. The light bar LB, a mobile device MD, and a siren SR communicate with each other via the Wi-Fi interface module. In this example the mobile device MD functions as a control head and thus no additional control heads are needed. The light bar LB, siren SR and/or an additional vehicle system(s) interface VSI may be remotely controlled by mobile device MD. The wireless system comprises a light bar LB device including a Wi-Fi interface module, a siren SR device including an 802.11 chip, and a mobile device MD including an 802.11 chip. The siren SR device and the mobile device MD can communicate with each other (and the light bar) via the Wi-Fi interface module. An optional additional vehicle system interface VSI may be linked to the system either wirelessly or by a hard-wire connection. For example, the interface may include an 802.11 chip for communicating with the light bar LB Wi-Fi interface module or it may be hardwired to the light bar LB or the siren SR.

Figure 11:
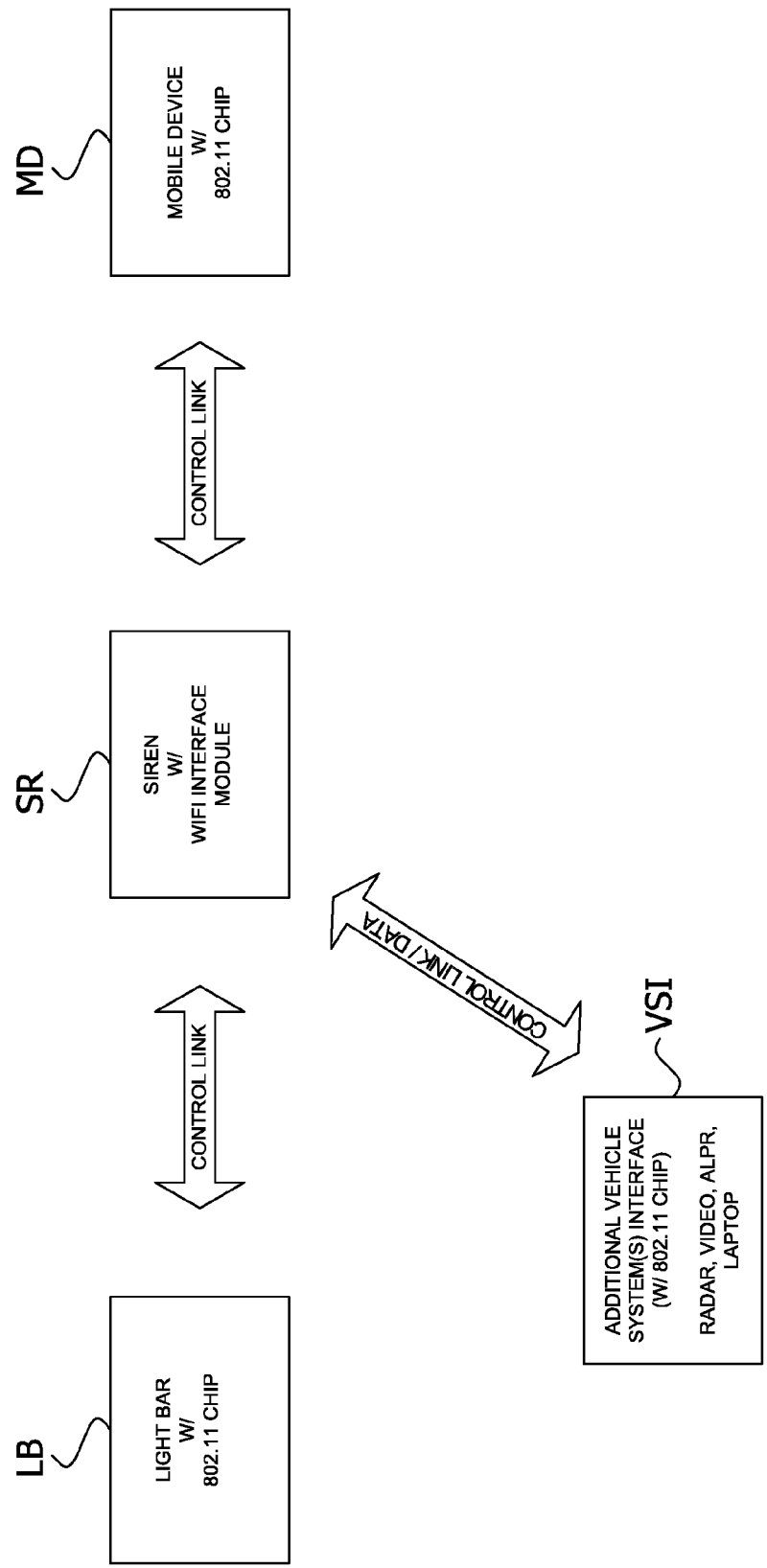
FIG. 11 illustrates an example wireless system in which a wireless communications circuit in the exemplary form of a Wi-Fi interface module is part of siren and the siren, a mobile device, and a light bar communicate with each other via the Wi-Fi interface module wherein the mobile device functions as a control head and no control heads are needed so that the light bar, siren and/or additional vehicle system(s) may be remotely controlled by mobile device.

Similarly, shown in FIG. 11 is an example wireless system with a wireless communications circuit in the exemplary form of a Wi-Fi interface module connected to a siren SR in which no control head is needed. The siren SR, a mobile device MD, and a light bar LB communicate with each other via the Wi-Fi interface module. In this example, the mobile device MD functions as a control head and thus no additional control heads are needed. In this example, the light bar LB, siren SR and/or an additional vehicle system(s) interface VSI may be remotely controlled by mobile device MD. The wireless system comprises a light bar LB device including an 802.11 chip, a siren SR device including a Wi-Fi interface module, a mobile device MD including an 802.11 chip. The light bar LB device and the mobile device MD communicate with each other (and the siren SR) via the Wi-Fi interface module. An optional additional vehicle system interface VSI may be linked to the system either wirelessly or by a hard-wire connection. For example, the interface may include an 802.11 chip for communicating with the siren SR Wi-Fi interface module or it may be hardwired to the light bar LB or the siren SR.

It is also contemplated that one or more functions of the light bars LB and/or sirens SR may be coordinated (e.g., synchronized) with each other so that their use and/or function are coordinated. For example, two or more light bars LB in communication with each other may be synchronized with each other such that the light patterns of the bars begin at the same time and/or have the same repetition rate. Alternatively, the light pattern of a first light bar LB may have a repetition rate which is a multiple of the repetition rate of a second light bar LB (e.g., the repetition rate of the first bar could be 1.5×, 2×, 3.25×, etc. of the repetition rate of the second light bar LB).

Similarly, as another example, two or more sirens SR in communication with each other may be coordinated with each other. Similarly, as another example, one or more light bars LB in communication with one or more sirens SR may be coordinated with each other.

In one form, coordinating means that the repetition rate of light patterns of the light bars LB may be offset, the same, alternating, otherwise synchronized or purposefully unsynchronized yet coordinated so that each light bar LB output can be distinguished from the other light bar LB outputs. In one form, synchronizing also means that the repetition rate of audio outputs of the sirens SR may be coordinated, the same or alternating or otherwise synchronized so that each audio output can be distinguished from the other audio outputs. In one form, synchronizing also means that the light pattern of one or more light bars LB may have a repetition period which is coordinated, the same or alternating with a repetition period of the audio output of one or more sirens SR. FIGS. 12-15 illustrate various exemplary synchronization configurations.

Figure 12:
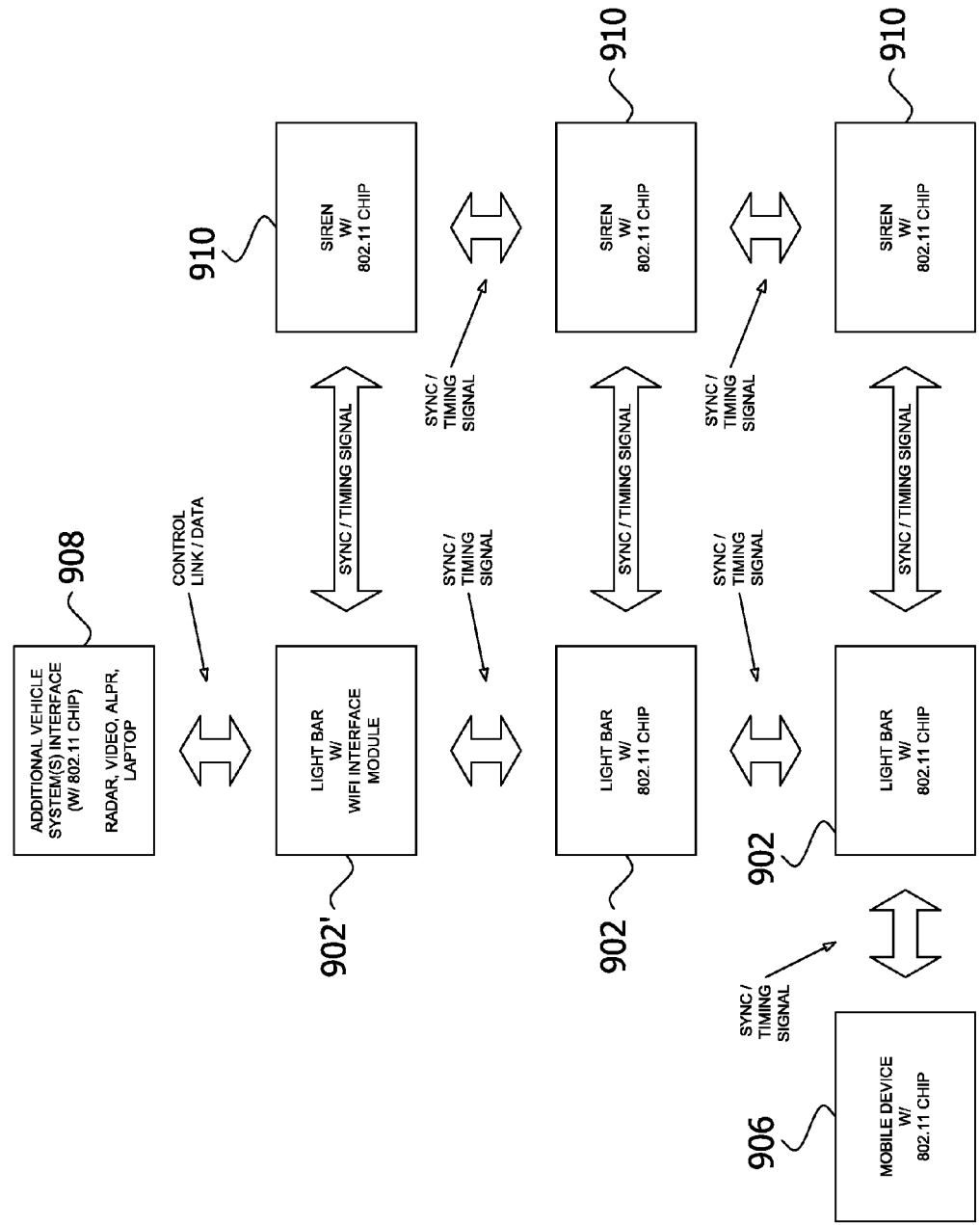
FIG. 12 illustrates an example wireless system in which a wireless communications circuit in the exemplary form of a Wi-Fi interface module is part of one of the light bars and the light bars, a mobile device, additional vehicle system(s) interface, and sirens communicate with each other and/or are coordinated via the Wi-Fi interface module wherein the mobile device functions as a control head. Each of the light bars, a mobile device, additional vehicle system(s) interface, and sirens may be independent of each other and mounted on separate vehicles.
Figure 13:
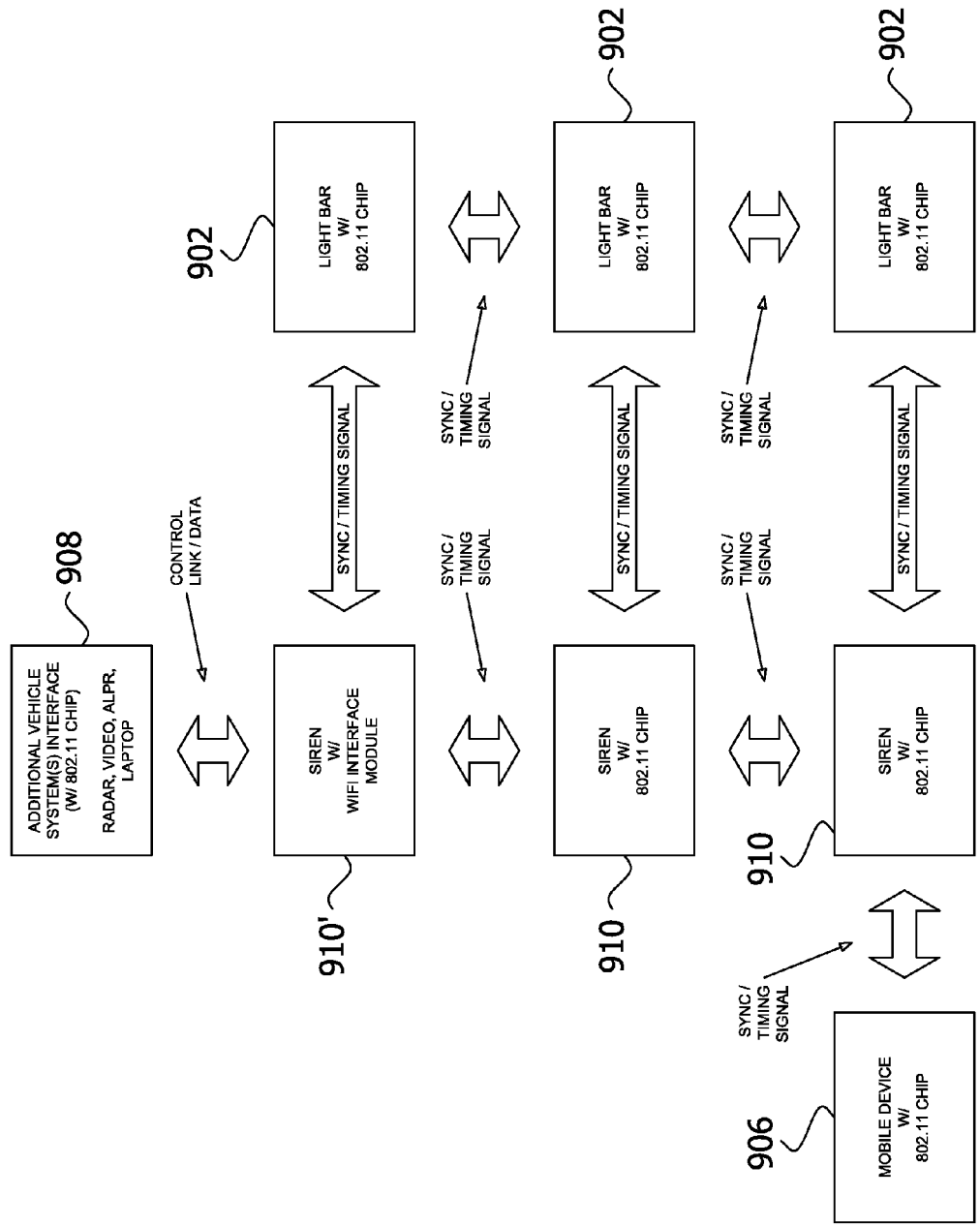
FIG. 13 illustrates an example wireless system in which a wireless communications circuit in the exemplary form of a Wi-Fi interface module is part of one of the sirens and the sirens, a mobile device, additional vehicle system(s) interface, and light bars communicate with each other and/or are coordinated via the Wi-Fi interface module wherein the mobile device functions as a control head.
Figure 14:
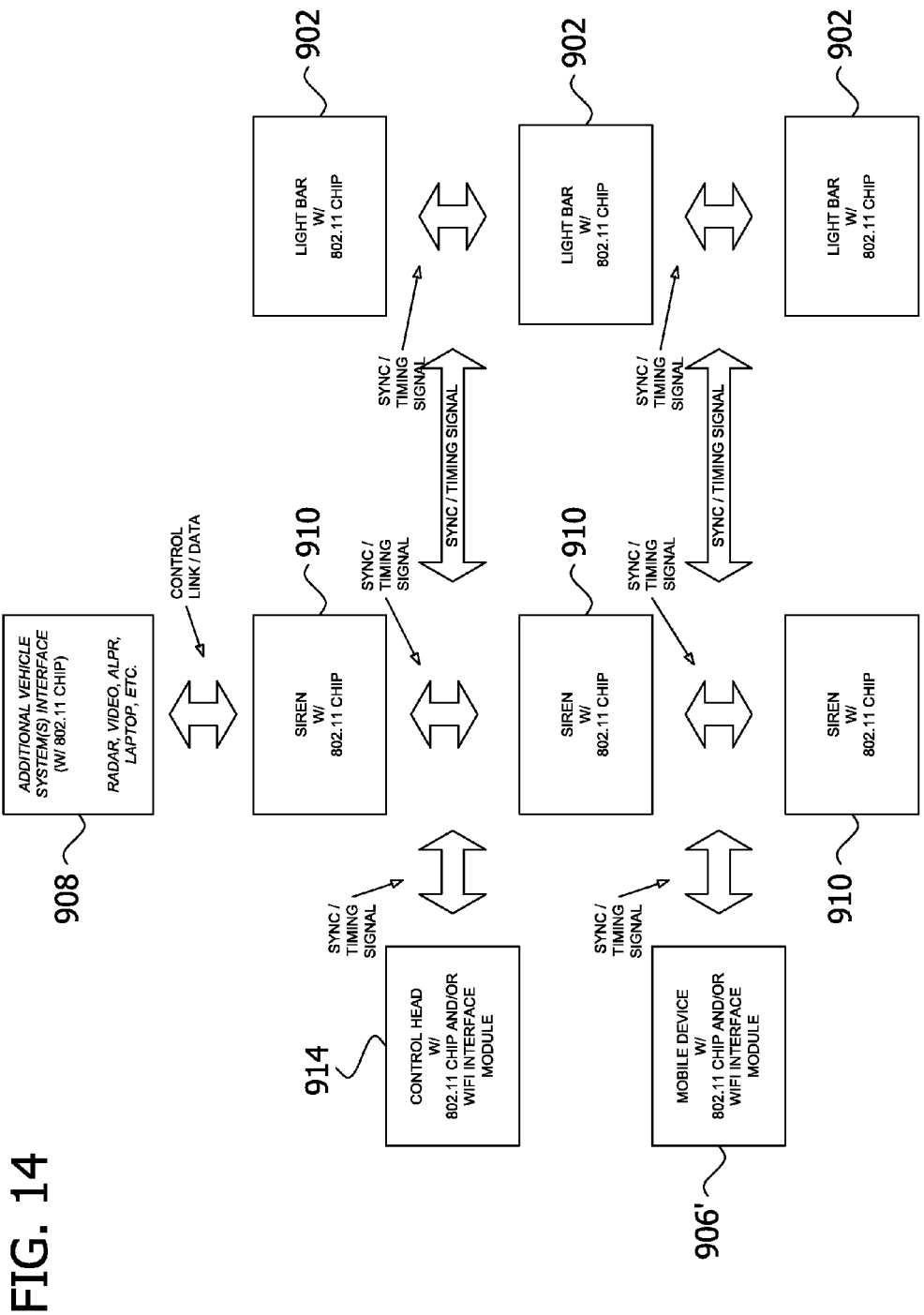
FIG. 14 illustrates an example wireless system in which a wireless communications circuit in the exemplary form of a Wi-Fi interface module is part of a control head or a mobile device and sirens, additional vehicle system(s) interface and light bars communicate with each other and/or are coordinated via the Wi-Fi interface module wherein the mobile device and/or a control head controls the sirens and light bars.
Figure 15:
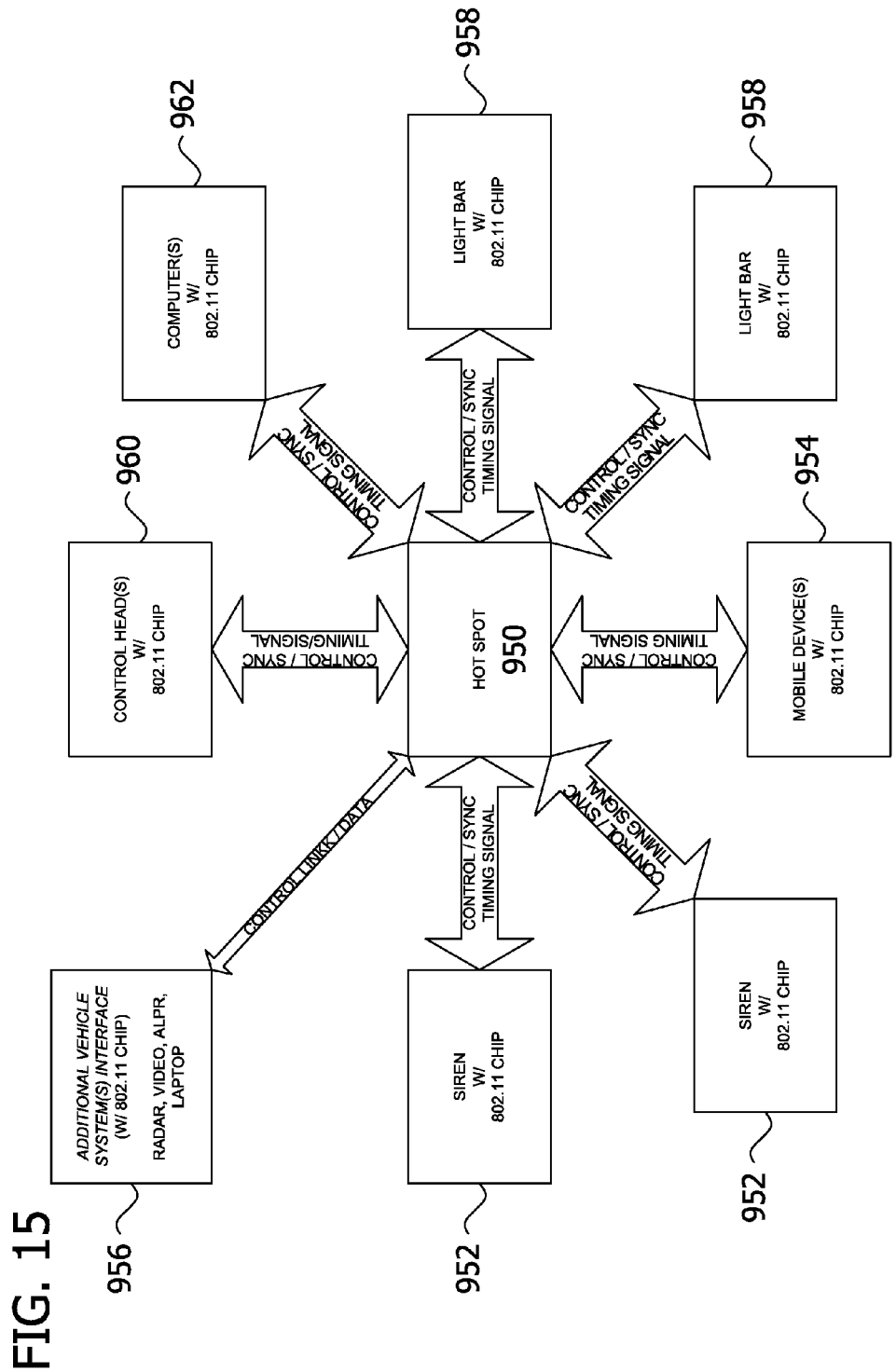
FIG. 15 illustrates an example wireless system in which a hot spot provides Internet access and linking between one or more of the following: a siren, a mobile device, an additional vehicle system interface and a light bar. As a result, the linked devices communicate with each other and the Internet and are capable of being controlled and/or coordinated.
Figure 16:
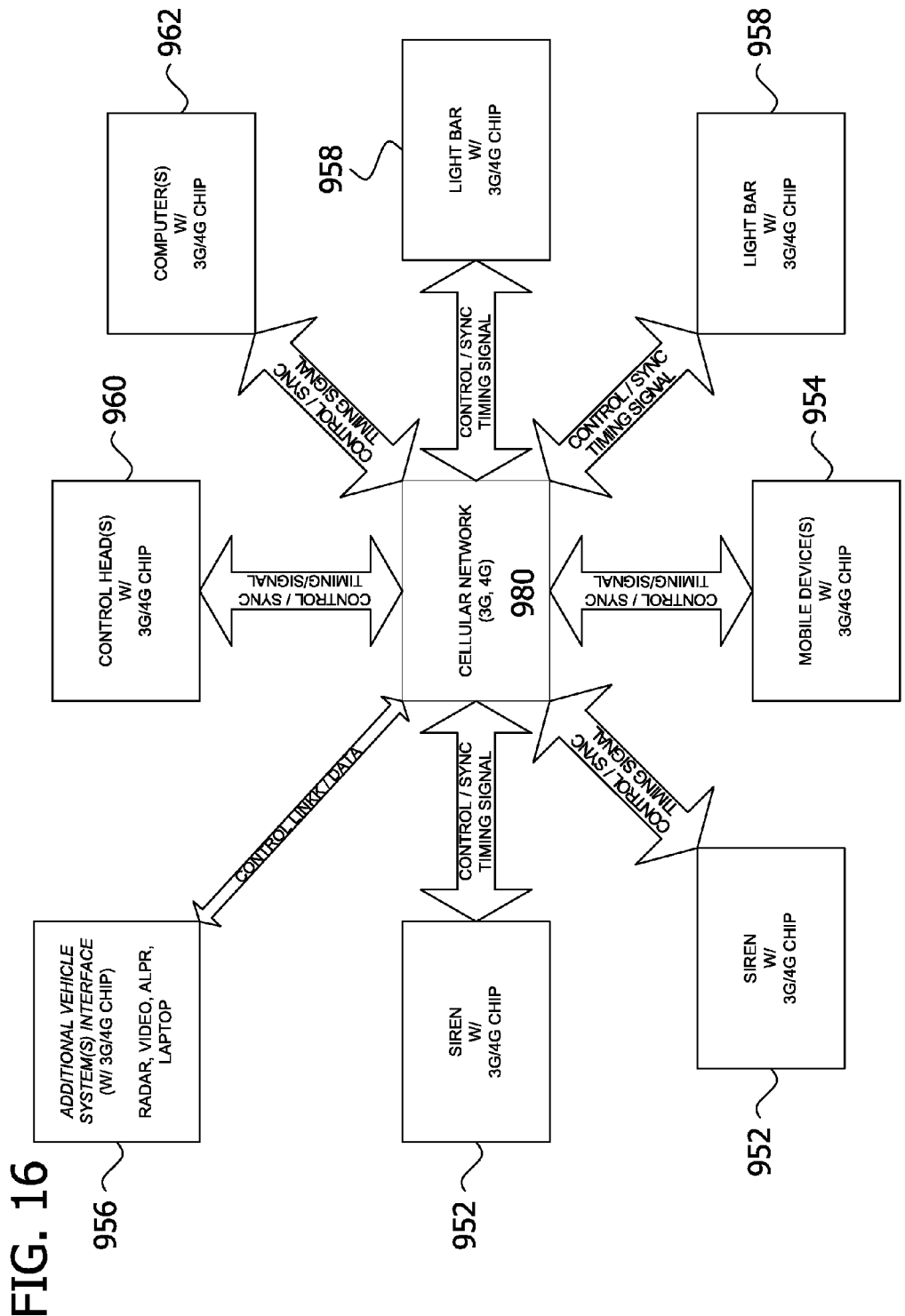
FIG. 16 illustrates an example wireless system in which a cellular network provides linking between one or more of the following: a siren, a mobile device, an additional vehicle system interface and a light bar. As a result, the linked devices communicate with each other and the cellular network and are capable of being controlled and/or coordinated.

In FIGS. 12-16, the arrows generally indicate examples in which a coordination signal is communicated between devices and wherein the coordination signal includes a synchronization signal and/or a timing signal. Any mobile device 906, light bar 902, siren 910 or control head 914 in communication may generate the coordination signal. In FIGS. 12-14, the mobile device 906, one of the light bars 902, or one of the sirens 910 in communication may generate the coordination signal. In FIGS. 15-16, one of the mobile devices 954, one of the light bars 958, one of the sirens 952, one of the computers 962 or one of the control heads 960 in communication may generate the coordination signal.

For example, FIGS. 12-16 illustrate a system comprising at least one of:
  two or more light bars 902, 952;
  two or more sirens 910, 952; and
  one or more sirens 910, 952 and one or more light bars 902, 958.

The light bars and the sirens of the system have repeating patterns and the timing of each of the repeating patterns are coordinated with each other. For example, the patterns may have repeating periods which are multiples of each other. As another example, the patterns are timed to be out of synchronization with each other. A vehicle system interface 908 is for an additional vehicle system for controlling the additional vehicle system by the mobile device via a wireless communications circuit in the exemplary form of a Wi-Fi interface module.

As another example, the light bars 902 comprise Wi-Fi-enabled light bars having a plurality of light heads controlled by a processor to provide a light pattern. The Wi-Fi-enabled light bars include a module connected to the Wi-Fi-enabled light bar for communicating with one or more other light bars of the system and for communicating with one or more sirens of the system so that the light bar when energized generates a repeating pattern which is coordinated with the other light bars and other sirens communicating with the light bar.

In one form, a coordination signal includes a signal causing a device to initiate a signal or pattern. For example, a coordination signal may cause two or more light bars to simultaneously begin providing a visual light pattern which are the same or similar or which patterns have related repetition rates. Optionally, the signal may indicate which pattern to initiate. The light patterns may be the same or different patterns. As another example, a coordination signal may cause two or more sirens to simultaneously begin providing an audio signal. The audio signals may be the same or different patterns. As another example, a coordination signal may cause one or more light bars to provide a visual light pattern and one or more sirens to simultaneously begin providing an audio signal. The coordination signal may be transmitted once or periodically repeated.

Alternatively or in addition, a coordination signal may include a timing signal used by a device to initiate a signal or pattern and to execute the signal or pattern in synchronization with the timing signal. The timing signal would be a periodic signal which would control the repetition rate of patterns being provided by the devices and the execution rate of patterns being provided by the devices.

As an example of a coordination signal which is a timing signal, suppose a first light bar is programmed to provide a first visual light pattern having a 10 second period. Suppose a second light bar is programmed to provide a second visual light pattern having a 20 second period. Suppose a third light bar is programmed to provide a third visual light pattern having a 15 second period. Suppose a first siren is programmed to provide a first audio signal having a 2 second period. Suppose a second siren is programmed to provide a second audio signal having a 6 second period. A device producing the timing signal would provide a periodic signal used by the first, second and third light bars and used by the first and second sirens to time the generation of their programmed signals. As an example, the periodic signal may be a pulsed signal having a pulse every 0.5 seconds. On the first pulse, each device would begin providing its pattern. The first light bar would provide the first visual light pattern every 40 pulses. The second light bar would provide the second visual light pattern every 80 pulses. The third light bar would provide the first visual light pattern every 30 pulses. The first siren would provide the first audio pattern every 4 pulses. The second siren would provide the second audio pattern every 12 pulses.

As a result, multiple properly equipped and configured vehicles located in near proximity to each other may be configured to automatically communicate and coordinate the flashing warning lights and/or their sirens. For example, currently when multiple police cars are at a scene, the emergency warning lights on each vehicle operate independently from the other vehicles. This creates an often confusing array of seemingly random flashing lights. According to one example, the light bars may be synchronized to cause the lights to flash in unison and create a more organized visual reference (and therefore safer) for approaching traffic.

FIG. 12 illustrates an example wireless system in which a wireless communications circuit in the exemplary form of a Wi-Fi interface module is included in a light bar 902'. Other light bars 902, a mobile device 906, an additional vehicle system(s) interface 908, and sirens 910 each include an 802.11 chip and can wirelessly communicate with each other (and the light bar 902') via control links which may also transfer data. Alternatively, or in addition, the light bars 902 and sirens 910 may be coordinated via the Wi-Fi interface module such that the mobile device 906 functions as a control head for the light bars and sirens.

FIG. 13 illustrates an example wireless system in which a wireless communications circuit in the exemplary form of a Wi-Fi interface module is in included in a siren 910'. Other sirens 910, a mobile device 906, an additional vehicle system(s) interface 908, and light bars 902 each include an 802.11 chip and can wirelessly communicate with each other (and the siren 910') via control links which may also transfer data. Alternatively, or in addition, the light bars 902 and sirens 910 may be coordinated via the Wi-Fi interface module such that the mobile device 906 functions as a control head for the light bars and sirens.

FIG. 14 illustrates an example wireless system in which wireless communications circuits in the exemplary form of a Wi-Fi interface module or 802.11 chip are included in a control head 914, a mobile device 906', sirens 910, additional vehicle system(s) interface 908, and light bars 902. The control head 914, mobile device 906', sirens 910, additional vehicle system(s) interface 908, and light bars 902 can communicate with each other via the wireless communications circuits. The mobile device 906' and/or the control head 914 can coordinate the operation of the sirens 910 and light bars 902 via the wireless communications circuits.

FIG. 15 illustrates an example wireless system in which a hot spot 950 (i.e., a small area that provides a wireless local area network and optionally wireless Internet access through WiFi typically using a device such as a wireless router) provides a wireless communication link between one or more of the following: a siren 952, a mobile device 954, an additional vehicle system interface 956 and a light bar 958. Through the use of the wireless link, two or more of the siren 952, mobile device 954, additional vehicle system interface 956 and light bar 958 can establish a common communication link and become linked devices. By becoming linked devices, the operation of the devices can be jointly controlled and/or coordinated. The linked devices may optionally communicate over the Internet via the hot spot.

In one example, the hot spot 950 only provides a communication link for a local area network, but does not provide Internet or other global network access. The system comprises a hot spot for communicating over a local area network and at least one of:

Two or more light bars;

Two or more sirens; and

One or more sirens and one or more light bars.

The light bars and the sirens of the system communicate with each other via the hot spot which provides the communication link for the local area network. However, the light bars and the sirens of the system communicate with each other independent of the Internet or other global networks so that the light bars and the sirens of the system do not communicate with the Internet or other global networks.

It is also contemplated that a cellular network may be used to wirelessly establish communication between a mobile device and the other components, as shown in FIG. 16. FIG. 16 illustrates an example wireless system in which a cellular network 980 provides a wireless communication link between one or more of the following: a siren, a mobile device, an additional vehicle system interface and a light bar. Through the use of the cellular network, two or more of the siren, mobile device, additional vehicle system interface and light bar can establish a common communication link and become linked devices. By becoming linked devices, the devices can communicate with each other over the cellular network and their operation can be jointly controlled and/or coordinated.

In this example, the system comprises at least one of:

Two or more light bars communicating with a network;

Two or more sirens communicating over a network;

One or more sirens communicating over a network and one or more light bars communicating over a network.

The light bars and the sirens of the system communicate with each other via the network, wherein the light bars and are controlled by a mobile device communicating via the network.

It is also contemplated that an existing light bar and/or siren or both may be retrofitted with a wireless communications circuit to permit control via a mobile device. In one example, a vehicle having a power supply would have a light bar and a control head previously installed. A wireless communications circuit is retrofitted to the vehicle. The module is connected to the control head or the light bar and communicates with a mobile device via a user interface provided to the mobile device by a wireless communications circuit. The module is powered by the power supply and the user interface is for use by the operator to provide operating instructions to the light bar via the wireless communications circuit.

The system of any of the above example may include a flashlight as the mobile device. The flashlight in these systems has a processor and a screen for displaying a GUI.

Alternatively or in addition, the above systems may include a mobile APP (application) executable by the mobile device for communicating with the wireless communications circuit.

In the examples of FIGS. 1-15, there is no need for a connection to the Internet or other cellular or global network. In some of the various examples, it is contemplated that the wireless communications circuit would function as a router to facilitate communication between the various components and devices. For example, each of the systems of FIGS. 1-15 may be configured to operate independent of any access to a network such as the Internet or other global network. The various components of each of the systems of FIGS. 1-15 may communicate with each other without Internet or other network access. Thus, the various components of each of the systems of FIGS. 1-15 may communicate with each other at any location and in various environments. For example, in FIG. 15, the hot spot functions as a router to connect the various components and Internet access is optional. In contrast, FIG. 16 employs a 3G or 4G cellular network to facilitate communication between the various components of the system.

In the examples of FIGS. 1-16, a wireless communications circuit in the exemplary form of one Wi-Fi interface module or transceiver has been illustrated for convenience. It is contemplated that a vehicle may have two or more wireless communications circuit, at least two of which are redundant and simultaneously provide communication. When using multiple communication circuits, each circuit may employ the same or different protocols. It is also contemplated that a vehicle may have two or more wireless communications circuits, each of which is independent of the others, and/or each of which links to only certain devices of the system.

The above summary is provided to introduce a selection of concepts in simplified form that are further described in the Detailed Description. The summary is not intended to identify key features or essential features of the claimed subject matter, nor is it intended to be used as an aid in determining the scope of the claimed subject matter.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, at least some embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

At least some embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

At least some embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and at least some embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples and embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several examples, embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

The Abstract and summary are provided to help the reader quickly ascertain the nature of the technical disclosure. They are submitted with the understanding that they will not be used to interpret or limit the scope or meaning of the claims.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various examples and embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system for coordinating usage of emergency devices on emergency vehicles comprising at least one of:
   two or more light bars, each light bar associated with a light bar controller that is configured to provide a repeating visual light pattern from its associated light bar;
   two or more sirens, each siren associated with a siren controller that is configured to provide a repeating audio pattern from its associated siren; or
   one or more light bars and one or more sirens, each light bar associated with a light bar controller that is configured to provide a repeating visual light pattern from its associated light bar, and each siren associated with a siren controller that is configured to provide a repeating audio pattern from its associated siren;
   wherein each light bar controller and each siren controller of which the system is comprised are linked by a communication medium and are configured to coordinate a timing of at least one of the repeating visual light patterns, the repeating audio patterns, or one or more of the repeating visual light patterns and one or more of the repeating audio patterns.

2. The system of claim 1, wherein the light bars comprise:
   a first light bar mounted on a first vehicle and connected to a wireless communications circuit that is configured to provide a wireless communication link to the first light bar; and
   a second light bar mounted on a second vehicle and connected to a wireless communications circuit that is configured to provide a wireless communication link to the second light bar; and
   the system further comprising a mobile device configured with a wireless communications circuit to communicate wirelessly with the first and second light bars, the mobile device configured to transmit a coordinating signal to the first and second light bars to synchronize the repeating visual light patterns of the first and second light bars.

3. The system of claim 1 wherein at least one of the following:
   the repeating visual light patterns have repeating periods which are multiples of each other; or
   the repeating visual light patterns are timed to be out of synchronization with each other.

4. The system of claim 1, wherein the sirens comprise:
   a first siren mounted in the first vehicle and connected to a wireless communications circuit that is configured to provide a wireless communication link to the first siren; and
   a second siren mounted in the second vehicle and connected to a wireless communications circuit that is configured to provide a wireless communication link to the second siren; and
   the system further comprising the mobile device configured with a wireless communications circuit to communicate wirelessly with the first and second sirens, the mobile device configured to transmit a synchronizing signal to the first and second sirens to synchronize the repeating audio patterns of the first and second light sirens.

5. A mobile device for coordinating usage of signaling equipment on a plurality of vehicles, the signaling equipment including a first light bar that is mounted on a first vehicle and provides a first visual light pattern, a first siren that is mounted on the first vehicle and provides a first audio pattern, a second light bar that is mounted on a second vehicle and provides a second visual light pattern, and a second siren that is mounted on the second vehicle and provides a second audio pattern, wherein the first and second light bars and the first and second sirens each have wireless connections, the mobile device comprising:
   a wireless transceiver configured to wirelessly communicate with the first and second light bars and the first and second sirens; and
   a user interface for communicating commands to the first and second light bars and the first and second sirens; and
   wherein the mobile device is configured to transmit a coordinating signal to the first and second light bars to synchronize the first and second visual light patterns; and
   wherein the mobile device is further configured to transmit a synchronizing signal to the first and second sirens to synchronize the first and second audio patterns.

6. A system of signaling equipment remotely controllable by a mobile device that comprises a wireless transceiver configured to wirelessly communicate with light bars and sirens located on one or more vehicles and a user interface for communicating commands to the light bars and sirens located on the one or more vehicles, the system comprising:
   a light bar implemented with a wireless connection and configured to wirelessly receive from a mobile device operating instructions for controlling actuation of the light bar;
   a siren implemented with a wireless connection and configured to wirelessly receive from the mobile device operating instructions for controlling actuation of the siren; and
   a control head configured to send operating instructions to the siren and the light bar and configured to display status information relating to the siren and the light bar.

7. The system of claim 6 further comprising a wireless interface module adapted for operative connection to the light bar and the siren for providing a wireless communication link to the light bar and the siren; and
   wherein the system is configured for use with a mobile device configured with a wireless communications circuit to communicate wirelessly with the light bar and the siren via the wireless interface module when the mobile device is outside of the vehicle, the mobile device configured to transmit operating instructions to the light bar and the siren and configured to provide the user interface to receive the operating instructions to be transmitted to the light bar and siren.

8. The system of claim 6 wherein the control head has a wired connection with the siren and the light bar.

9. The system of claim 6 wherein the control head includes a display indicating a status of the light bar and a status of the siren, the user interface includes a display indicating the status of the light bar and the status of the siren, and the control head display and the user interface display are consistent with each other.

10. The system of claim 6 wherein the user interface comprises a graphical user interface that displays icons corresponding to the siren and the light bar.

11. The system of claim 6 further comprising a memory device connected to the wireless interface module, the memory device encoded with user interface instructions that when transmitted by the wireless interface module to the mobile device, result in a display of a webpage on the user interface of the mobile device.

12. The system of claim 6 further comprising a memory device encoded with a flash pattern program tool to be executed by a light bar processor associated with the light bar, the flash pattern program tool configured to change light flashing patterns stored in a memory of the light bar, and wherein the mobile device is configured to communicate with the flash pattern program tool via the light bar processor and via the wireless interface module to change the light patterns stored in the memory of the light bar.

13. The system of claim 6 wherein the mobile device is selected from a set of devices comprising: a cell phone, a smart phone, a tablet style computer, a laptop, a netbook, a utilitarian device having an integrated controller and a user interface, a flashlight having an integrated controller and a user interface, and a key fob controller.

14. The system of claim 13 wherein the user interface of the mobile device comprises a mobile APP (application) that is executable by the mobile device for communicating with the wireless interface module.

15. The system of claim 13 further comprising an interface for an additional vehicle system for controlling the additional vehicle system by the mobile device via the wireless interface module.

16. The system of claim 13 wherein the user interface of the mobile device comprises a graphical user interface for display on a touch screen of the mobile device, the graphical user interface including a plurality of icons for controlling functions of the light bar and functions of the siren.

17. A system comprising:
a linking device configured to provide a hot spot for communicating over a global area network; and
at least one of two or more light bars, two or more sirens, or one or more sirens and one or more light bars;
wherein multiple ones of the light bars, multiple ones of the sirens, or at least one of the light bars and one of the sirens of the system communicate with each other via the hot spot and communicate with each other independent of the global area network.

18. The system of claim 17 wherein:
one of the light bars is implemented with a wireless connection and configured to wirelessly receive operating instructions for controlling actuation of the light bar; and
one of the sirens is implemented with a wireless connection and configured to wirelessly receive operating instructions for controlling actuation of the siren;
wherein the light bar and the siren are configured to communicate with each other via the hot spot, and wherein the light bars and the sirens of the system communicate with each other independent of the global area network.

19. The system of claim 18 wherein the light bars and the sirens of the system do not communicate with the global area network.

20. A system comprising:
at least one of two or more light bars communicating with each other, two or more sirens communicating with each other, or one or more sirens communicating with one or more light bars; and
wherein each light bar and each siren of the system are controlled by a mobile device communicating via a cellular network.

* * * * *